US00RE35336E

United States Patent [19]

Ulch et al.

[11] E Patent Number: Re. 35,336

[45] Reissued Date of Patent: Sep. 24, 1996

[54] SELF-CONTAINED PROGRAMMABLE TERMINAL FOR SECURITY SYSTEMS

[75] Inventors: Bryan D. Ulch, Valencia; Donald P. Sturgis, Claremont; Robert J. Fox, Los Angeles, all of Calif.

[73] Assignee: Casi-Rusco, Inc.

[21] Appl. No.: 930,855

[22] Filed: Aug. 14, 1992

Related U.S. Patent Documents

Reissue of:

[64] Patent No.: 4,218,690
Issued: Aug. 19, 1980
Appl. No.: 874,283
Filed: Feb. 1, 1978

[51] Int. Cl.[6] ..... G06K 5/00; H04Q 9/00; G05B 23/00

[52] U.S. Cl. ..... 340/825.31; 340/652

[58] Field of Search ..... 340/825.31, 652, 340/825.34; 235/382

[56] References Cited

U.S. PATENT DOCUMENTS

| | | | |
|---|---|---|---|
| 3,581,282 | 5/1971 | Altman . | |
| 3,761,682 | 9/1973 | Barnes et al. | 235/382 |
| 3,781,805 | 12/1973 | O'Neal, Jr. | 235/382 |
| 3,848,229 | 11/1974 | Perron et al. | 235/382 |
| 3,852,571 | 12/1974 | Hall . | |
| 3,859,634 | 1/1975 | Perron et al. | 235/382 |
| 3,866,173 | 2/1975 | Moorman et al. | 340/825.31 |
| 3,896,266 | 7/1975 | Waterbury . | |
| 3,959,633 | 5/1976 | Lawrence et al. | 235/459 |
| 4,025,760 | 5/1977 | Trenkamp | 340/825.34 |
| 4,097,727 | 6/1978 | Ulch | 235/382 |

FOREIGN PATENT DOCUMENTS

| | | |
|---|---|---|
| 1300848 | 12/1972 | United Kingdom . |
| 1407660 | 12/1975 | United Kingdom . |
| 1467155 | 9/1993 | United Kingdom . |

*Primary Examiner*—Michael Horabik
*Attorney, Agent, or Firm*—Knobbe, Martens, Olson & Bear

[57] ABSTRACT

A security system is disclosed which utilizes plural remote terminals for controlling access at plural locations throughout a secured area or building. Each of these remote terminals is capable of independent functioning, and includes a memory for storing plural independent identification numbers which define the personnel who will be granted access. These numbers stored in the terminal memories may be different from terminal to terminal, or may be uniform throughout the system, and may be the same as a list stored at a central processing location. Thus, access may be limited to the same group of individuals regardless of whether it is provided by a central memory list or a remote memory list. The remote memories provide total memory flexibility, so that the deletion of identification numbers from the list does not reduce the memory size. The memory, in addition to identification numbers, stores data defining real time access limitations for each of the individuals who will be granted access, so that flexibility in time of day access control is provided on a programmable basis.

14 Claims, 3 Drawing Sheets

SELF-CONTAINED PROGRAMMABLE TERMINAL FOR SECURITY SYSTEMS

Matter enclosed in heavy brackets [ ] appears in the original patent but forms no part of this reissue specification; matter printed in italics indicates the additions made by reissue.

BACKGROUND OF THE INVENTION

This invention relates to security systems and, in the preferred embodiment, to magnetically encoded data card security systems in which access at a secured location is controlled by a comparison of data on a card inserted by personnel into the system with data stored in the system and defining those persons who shall be granted access. More particularly, this invention relates to a system in which, in addition to card data, keyboard data may be entered by persons wishing access, the keyboard data being a combination and permutation of the card data. In such a system, the present invention provides a substantially broader degree of flexibility in system control than was previously available, since it permits independent programming of terminals at each of plural remote locations in a system where the remote terminals, under normal circumstances, operate in conjunction with a central processor to regulate access. Thus, with this system flexibility, it is possible, even when communication is interrupted between the central processor and the remote terminals, to limit access at the remote terminals in accordance with either (a) the same identification list as is stored in the main memory, (b) a more stringent list, or (c) a more liberal list, as the user desires. Such flexibility has not heretofore been available. Furthermore, the ability to program a memory list to define who shall be provided access at each of the independent terminals, is accomplished in the present invention in a manner which permits identification numbers to be added and deleted from the system without affecting the system's memory capacity.

Security systems utilizing remote terminals to limit access at individual remote locations have, in the past, utilized static magnetic card readers at these remote locations for controlling access through electrically operable devices, such as doors, turnstiles, printers, etc. Prior art systems have been devised in which the remote card readers communicate with a central data processor or operate as stand-alone units.

The card or badge bearing encoded data used for controlling access is typically inserted into a slot of a reader which reads and decodes the data on the card. Advantageously, this data is encoded as a plurality of magnetically polarized spots in a sheet of magnetic material. Such encoded data normally includes an identification number or numbers identifying the card holder. During use, this number encoded by the card is compared with a number or numbers stored in the central computer terminal in multi-terminal systems using central processors or at the remote locations in totally stand-alone systems, all to ascertain whether the individual inserting the card is entitled to access to a building, room, parking lot, or the like.

In one prior art embodiment, the magnetically polarized spots are used to directly actuate a read relay or other moving switch mechanism located within the reader. In the state-of-the-art system, as is exemplified by U.S. Pat. No. 3,686,479 entitled "Static Reader System For Magnetic Cards", assigned to A-T-O, Inc., assignee of the present invention, electromagnetic solid state sensors are used. These sensors are disclosed and claimed in U.S. Pat. No. 3,717,749, also assigned to A-T-O, Inc. These patents are hereby incorporated in this disclosure by reference. Such systems have been found to be very reliable and are in use as access control systems in a number of different industries, universities, and government installations.

Operation of such systems as a part of a security network employing a central processor is disclosed and claimed in U.S. Pat. No. 4,004,134, also assigned to A-T-O, Inc., and also incorporated herein by reference. This latter system incorporates a central processor which periodically and sequentially polls each of the remote terminals in the system. The remote terminals are able to transfer data to the central processor only on receipt of a polling pulse. At the central terminal, data read at the remote location from an inserted card is compared with a master list which includes those persons who shall be given access at that remote location. Such systems, in the past, have permitted a limited degree of remote terminal operation, even if some or all of the interconnecting lines between the remote terminal and the central processor have been interrupted. The systems, however, generally require that a much simpler test be made of persons wishing entrance during such degraded mode operation, and thus the group of persons allowed access at such times is, of necessity, much larger than would normally be granted access. This is a distinct disadvantage in such systems, since it does not permit a controlled programmable access under all circumstances as is often required in secured locations.

An improved system for providing degraded operation in such a central processor-oriented system is disclosed and claimed in patent application Ser. No. 830,002, filed Sep. 1, 1977, entitled "Circuit For Controlling Automatic Off-Line Operation of An On-Line Card Reader", assigned to A-T-O, Inc., the assignee of the present invention, and incorporated herein by reference. Even in that improved system, there is no substantial system flexibility regarding the persons who will be granted access during degraded mode operation, and it is common in a system of that type to provide access during degraded mode operation to any person having a card coded for use within the overall security system, even if it is not coded for use at this particular remote location.

The communication lines used in a security system of this type, where a central processor is utilized for controlling the operation of plural remote terminals, provide an even greater level of security if the communication lines are monitored to assure that they are not tampered with and that their integrity is not degraded. A system for accomplishing this purpose is disclosed and claimed in U.S. patent application Ser. No. 827,994, filed Aug. 26, 1977, and entitled "System For Monitoring Integrity of Communication Lines In Security Systems Having Remote Terminals", this application being assigned to A-T-O, Inc., the assignee of the present invention and incorporated herein by reference.

It has also been known in the prior art to include at the remote location a keyboard. Typically such keyboard systems require that persons wishing access, in addition to the insertion of a magnetically encoded data card, are required to enter keyboard data, typically a sequence of digits. These digits have typically comprised a particular permutation and combination of the data encoded on the employee's card, the particular permutation and combination often being different for different remote terminals. Some prior systems have used hardwired permutation and combination circuits which did not permit alteration after the system was installed. A more advanced keyboard system, which permits programming of the particular permutation and combination after installation, is disclosed and claimed in U.S. patent application Ser.

No. 830,004, filed Sept. 1, 1977, entitled "Remotely Programmable Keyboard Sequence For A Security System", assigned to A-T-O, Inc., the assignee of the present invention and incorporated herein by reference.

While these systems disclosed in the prior art have provided a relatively flexible, sophisticated security network, certain persistent problems have remained unsolved. One of these problems involves the fact that systems utilizing a central processor invariably provide very broadly based access during degraded communication line operation. In addition, the prior art systems in which remote terminals are used to store lists of identification numbers for selective access have permitted changes in the access lists only at the expense of reduced memory size since, in the prior art, the elimination of an identification number from a memory storage location has typically required the destruction of that memory location.

In addition, those prior art systems which utilized real-time clocks for limiting access through a particular terminal to different personnel at different times of day, have been fairly limited in their flexibility and typically required that a person be issued a new entrance card or badge if his time of entry was to be changed. Such systems, therefore, greatly reduced the flexibility of real-time access control. In addition, such systems have not provided plural overlapping time zones so that various personnel could be provided access at different times of day which were not mutually exclusive.

SUMMARY OF THE INVENTION

The present invention solves these persistent problems in the prior art and provides, through their solution, an extremely powerful and flexible terminal system for secured access control. This system includes independent programmable identification listings at each of the plural remote locations of those individuals who will be granted access at such locations. In addition, the system permits connection of a plurality of these remote terminals to a central processor which includes its own programmable memory listing of personnel who will be provided access at each of the remote locations. During normal operation, when a central processor is used, this central memory is used to provide access at each of the remote locations, since the use of a central processor permits a printer to be added to the system, which printer provides a record of personnel movement throughout the system on a continuous basis. The central processor system also permits programming of each of the remote units from a central location and thus makes the system easier to control and to operate.

Nevertheless, any difficulty in communication between the central processor and the remote terminals in this system will not degrade the system operation, since a complete list of personnel who will be provided access is stored in a programmable memory at the remote location. Thus, when faulty communication lines are detected, the system interrogates its own memory for access control, and the person inserting a card at the remote terminal has no way of determining that the communication lines are impaired.

Furthermore, the system of the present invention provides a flexible, solid state programmable memory which is operated in a manner which maintains identification numbers in numerical order within the memory. Such numerical ordering permits a binary search to be conducted so that an efficient determination can be made to determine whether a particular number is stored in the memory. When a number is deleted from the memory, the remaining entries in the memory are shifted to close the data order so that no voids remain. Thus, the end of the memory can always be checked to determine whether there is room for additional identification numbers.

It will be appreciated, of course, that since the terminals of the present invention have the capability of such stand-alone operation, they can be used in a totally stand-alone application where no central processor is provided. Even in such an application, these terminals permit total programming flexibility at each of the remote locations. It will be appreciated that, utilizing a terminal of this type, a mixed system, some terminals centrally controlled and some operated as stand-alone units, is permissible utilizing the same terminal throughout the system. In addition, it is possible to install a plurality of stand-alone terminals with the expectation that, at a later date as system requirements increase, a central processor may be added to control the already installed stand-alone remote terminals.

Whereas in the prior art systems which have time of day access control, a portion of a user's identification number typically included a time of day code, the present system utilizes such a time of day code only in combination with a user's identification number in memory. Thus, the user's card or badge does not itself define a time of day, and access at different remote locations may be provided using a single card at different times of day. In use, the present system responds to the insertion of a card by finding the user's identification number in memory and accessing an associated plurality of bits which determine the times of day at which access will be provided. If this defined time of day conforms with the time of day as monitored by real time clocks within the system, access will be provided. The time of day may be changed by changing each of plural clocks within the clock system itself. In addition, the particular clocks used for controlling access for each individual are programmable within the memory.

These and other advantages of the present invention are best understood through a reference to the drawings, in which.

DETAILED DESCRIPTION OF THE PREFERRED EMBODIMENT

Figure 1:
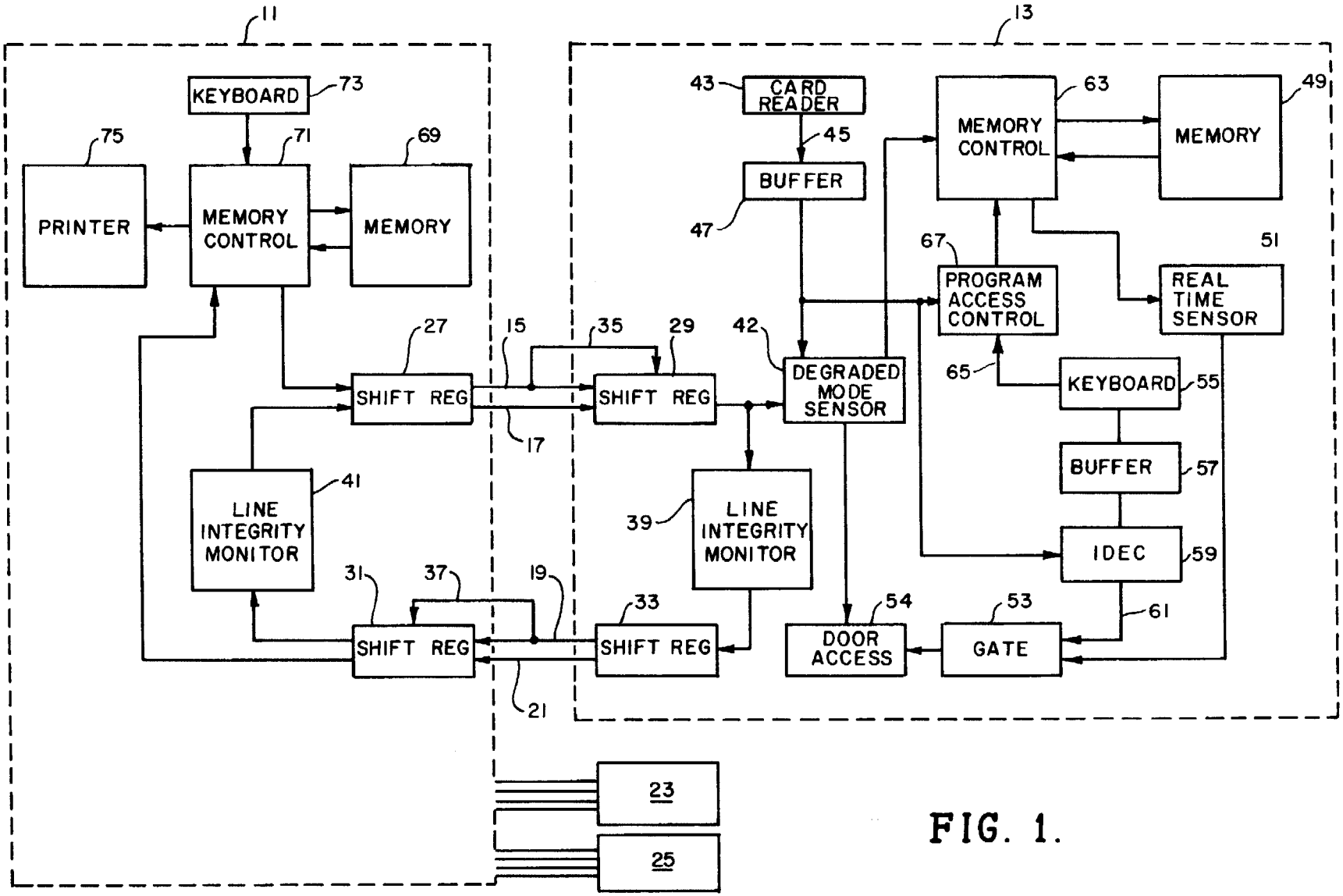
FIG. 1 is a schematic diagram of the overall system of the present invention showing the primary elements of a central processing unit and plural remote units.

Referring initially to FIG. 1, a central data processing unit 11 is shown connected to a particular remote terminal 13 by a pair of polling and data lines 15,17 and a pair of data lines 19 and 21. The polling lines 15 and 17, in a typical application, are unidirectional lines which enable the central data processing unit 11 to sequentially interrogate and send data to a plurality of remote terminals 13, 23, 25, etc. to determine which of these remote terminals require servicing. It will be understood throughout the remainder of the specification in this application that a large number of remote terminals may be connected to a single central processing unit 11 and that each of the remote terminals 23 and 25 performs substantially the functions described below with reference to the remote terminal 13.

It should be understood that the lines 15,17 are a line pair, the line 17, for example, providing a return for the line 15. Similarly, the line 21 provides a return for line 19. Polling signals and data which initiate at the central processor 11 are communicated to the remote terminal 13 on the line pair 15,17. Similarly, data signals produced at the remote terminal 13 are communicated to the central processor 11 on the line pair 19,21. It will be appreciated that words communicated on the line pairs 15,17 and 19,21 are most advantageously connected within the central and remote units 11,13 to shift registers 27–33. Thus, data sequentially clocked from register 27 onto lines 15,17 may be self-clocked, as shown by line 35 into shift register 29. Similarly, data sequentially clocked from the shift register 33 may be self-clocked, as shown by the connection 37, into the shift register 31.

Although the details of a line integrity monitoring system are not shown in FIG. 1 (in order to maintain the clarity of this disclosure), such a system is typically included in the communication system between the central processing unit 11 and the remote terminal 13, and is shown in FIG. 1 as a first line integrity monitor 39 within the remote terminal 13 interconnected between the shift registers 29 and 33, and a second line integrity monitor 41 in the central processing unit 11 interconnected between the shift register 31 and the shift register 27. The details of the line integrity monitoring circuits 39 and 41 are described in patent application Ser. No. 827,994, filed Aug. 26, 1977, mentioned previously. For the purpose of the present application, it is sufficient to understand that the line integrity monitoring system 41 causes the shift register 27 to sequentially poll the remote terminals 13,23,25, etc. by sending a polling signal on the lines 15 and 17. The remote terminals 13,23,25, etc., through the line integrity monitoring circuitry 39, respond to these polling signals by providing a calculated, predetermined response which is transmitted by way of the shift register 33 and data lines 19 and 21 to the shift register 31. This data returned from the remote terminal and placed in a shift register 31 is compared by the line integrity monitoring circuit 41 to determine whether an appropriate response has been received from the remote terminal and to thus verify the integrity of the lines 15,17,19,21. It will be understood by those skilled in this art that the continued integrity of these data and communication lines is extremely important, since systems built in accordance with the present invention are used to limit personnel access and the line integrity monitoring circuit 39,41 can provide an alarm, for example, at the central processor 11, whenever an intruder (or other cause) has interfered with the communication line network.

It is important to recognize at the outset of this disclosure that the remote terminal 13 is designed to operate as a stand-alone unit as well as a remote terminal for a central processor 11, and that it can therefore be utilized without the data communication lines 15 through 21, as described below.

A card reader or sensor 43, located in the remote terminal 13, substantially is described and claimed in U.S. Pat. Nos. 3,686,479 and 3,717,749, is used to sense magnetically encoded data on a card or badge inserted into the card reader 43. This data is transmitted, as by a line 45, to a buffer or storage register 47. In a typical system, the buffer 47 provides storage for five decimal digits, each of which can be any integer between zero and nine. The communication of these five digits requires four binary digits each, so that the interconnecting line 45, as well as the buffer 47, must be a 20-bit wide device. Data from the card inserted into the card reader 43 and supplying the 20 bits of information is typically placed into the register In the system of the present invention, this data will either be compared with data in a memory 49 (in the remote unit 13) to determine whether the five-digit identification number is present in the memory 49, or will be compared with data stored in the central processor 11, if it is connected. A degraded mode sensor 42 is typically connected in series between the buffer 47 and the memory 49 and is used to selectively send data from the buffer 47 via the shift register 33 to the central processor 11 or directly to the memory 49, depending upon the mode of operation of the terminal 13. If the terminal 13 is used as a stand-alone terminal, the degraded mode sensor 42 is bypassed so that the buffer 47 is linked directly to the memory system within the remote terminal. Alternatively, if the terminal 13 is used with a central processor, the degraded mode sensor 42 normally transmits data from the buffer 47 to the central processor unit via shift register 33 but can be used when the communication lines are degraded to transfer data from the buffer 47 directly to the memory 49 within the remote terminal. The degraded mode sensor may be substantially as described and claimed in patent application Ser. No. 830,002, filed Sept. 1, 1977, and referenced above.

If the memory 49 is being used, and stores an identification number identical to that in buffer 47, it will store, in conjunction with the number, a time code. This time code will be supplied by a memory control circuit 63, associated with the memory 49, to a real-time sensor circuit 51 which provides real-time input for the remote terminal 13. If the real-time input from the circuit 51 corresponds with the time data from the memory 49, the real-time circuit 51 will enable a gate 53 to provide access at the remote location, as through a door access control circuit 54.

In this system it is possible to provide, in addition to the memory 49, a secondary means for screening personnel for access. This mechanism includes a keyboard 55 attached to a buffer 57 and a circuit 59, referred to in FIG. 1 as an IDEC circuit. The IDEC circuit 59 is described in detail in patent application Set. No. 830,004, filed Sept. 1, 1977 and referred to previously. For the purpose of the present application, it is sufficient to understand that the IDEC circuit 59 requires that the person requiring access at the door 54 must input a sequence of numbers at the keyboard 55, which is identical to a plurality of numbers read by the card reader 43, but altered in sequence. The IDEC circuit responds to the data from the buffer 47 as well as the data from the buffer 57 to assure that the proper digits in the proper sequence are input at the keyboard 55. An output from the IDEC circuit 59 on line 61 is required at the gate 53, along with the output from the time of day circuit 51, in order to provide access at the door 54. It should be noted that the IDEC system 59 within the terminal 13 may be used regardless of whether the memory 49 or the central processor 11 memory is used for identification number comparisons.

It will be understood by those skilled in the art that the buffer 47 does not communicate directly with the memory 49, but rather is connected to a memory control 63 which accesses data to and from the memory and organizes the data in memory. This memory control 63 is connected to the keyboard 55 for programming purposes, as shown by line 65, which is connected in series with a supervisor's access circuit 67. The supervisor's access circuit 67 is connected to the buffer 47 and assures that, unless a supervisor's card has been inserted in the card reader 4,3, the keyboard 55 cannot be used to change the identification numbers or time zones stored in the memory 49. Thus, the keyboard 55 is connected to the IDEC circuit 59 at all times, but is connected to the memory control circuit 63 only when a supervisor's card is used. The supervisor's access module 67 is described and claimed in patent application Ser. No. 827,993, filed Aug. 26, 1977, and referred to above. Although not shown in detail in FIG. 1, it will be understood from the description in that application that the circuit 67 compares data from the buffer with a register to determine whether a supervisor's card has been inserted at the card reader 43, and permits access to the write logic incorporated in the memory control 63.

As has been common in the prior art, the central processor 11 may include a memory 69 and memory control 71 as well as a keyboard 73. Thus, the central processor, by monitoring data received from the remote unit 13 and placed in the shift register 31, may be used to grant or deny access through appropriate polling signals supplied from the memory 69 to the shift register 17. While the use, in general, of such a system at the central processor 11 forms a part of the present invention, the details are well known. Thus, the programming of the memory 69 utilizing the keyboard 73 and control 71 may be substantially identical to the programming described below for the memory 49 utilizing the memory control 63 and keyboard 55 at the remote unit. Furthermore, it should be understood that, using the techniques for programming which are described below, and well known communication techniques, it is possible through the communication lines 15–21 to interconnect the keyboard 73 with the memory control 63 in a standard fashion, so that the keyboard 73 may be used to program the memory 49 in one of the remote units 13.

It will also be understood that it is common at the central processor 11 to include a printer 73, typically connected to the memory control 71, for making a permanent record of access authorizations and denials at each of the remote units 13, so that the flow of personnel throughout the security system can be monitored.

Figure 2:
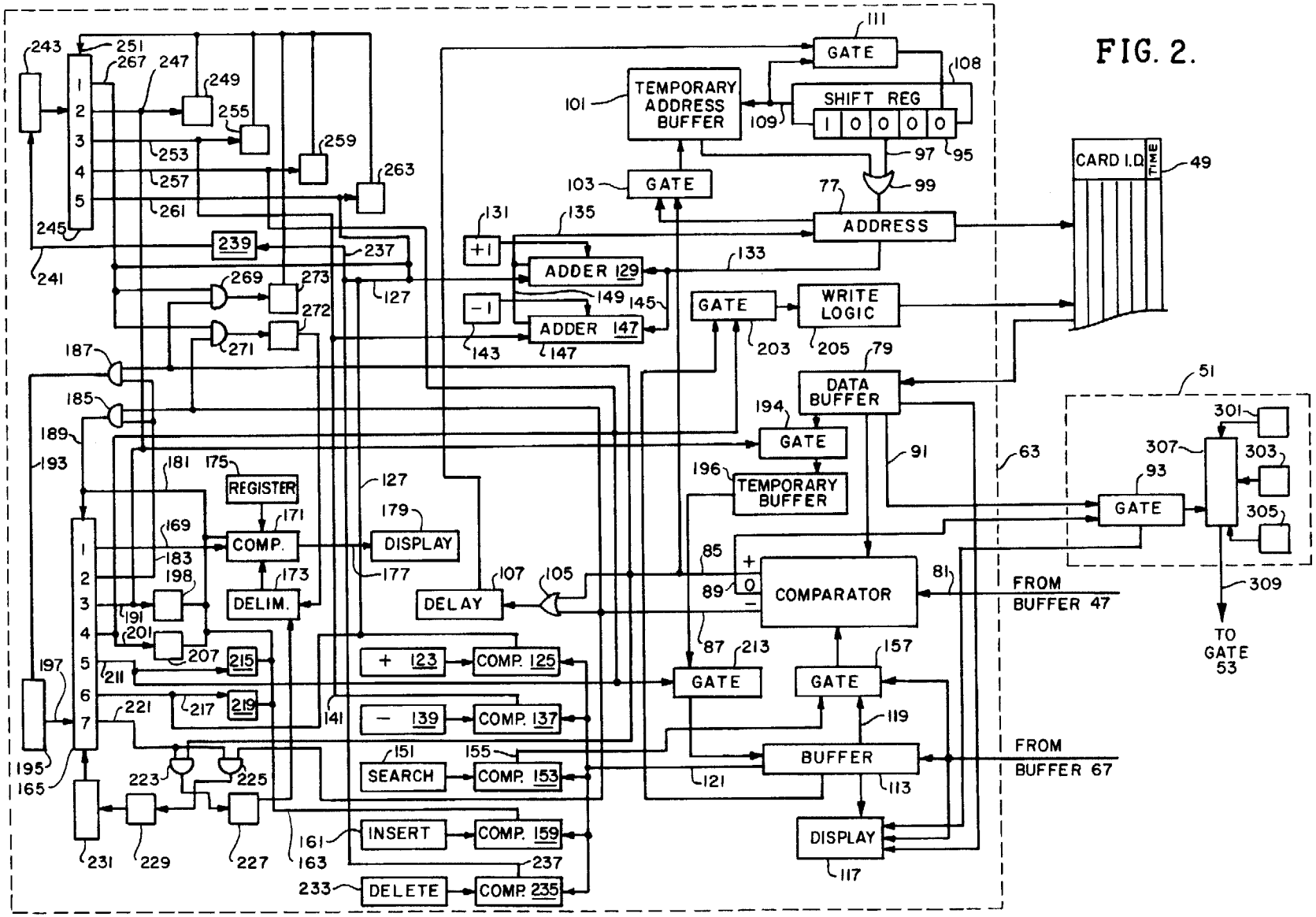
FIG. 2 is a more detailed schematic diagram showing the operation of the memory, memory control, and real-time sensor of the remote terminals of FIG. 1.

Referring to FIG. 2, the details of the memory 49, the memory control 63 as well as the real-time sensor and its connections to the gate 53 and door access control 55, will be described.

The memory 49 is shown schematically in FIG. 2 to include five columns of card identification data digits and a single column of time code digits. The memory 49 stores in numerical sequence the five-digit identification numbers corresponding to the cards or badges of those personnel who are to be granted access at this remote terminal. Following each such identification number is a time code between 1 and 8 delineating the times of day when that particular individual is to be granted access. This time of day control will be understood in more detail through the description which follows.

The memory 49 is a read and write memory, or RAM memory, as is commonly used in digital circuits and is accessed by means of an address buffer 77 which forms a part of the memory control 63. A data buffer 79 is directly connected to the memory 49 and is used to access data from the memory 49 in accordance with the address 77. In the simplest utilization of the memory 49, data from the card reader buffer 47 is supplied on a line 81 to a comparator 83 which is also supplied with data from the data buffer 79. The comparator 83 is designed to provide a signal on a plus line 85 whenever the number accessed from the card reader buffer 47 is smaller than the data from buffer 79, to provide a signal on a 5 minus line 87 whenever the data from the buffer 47 is larger than the data from the buffer 79 and to supply a signal on a zero line 89 when the data from the card reader buffer 47 is identical to the card identification data read from the data buffer 79. It will be understood that, since the time code data is not available from the buffer 47, only the card identification number portion, that is, the most-significant five digits, from the memory 49 is compared in the comparator 83. If the identification number from the buffer 47 is identical to the identification number accessed from the memory 49, indicating that the identification number from the card is present in the memory 49, a gate 93 is enabled to transfer the last four binary bits, conducted from the data buffer 79 on line 91, to the real-time sensor 51. This line 91 carries the decimal digit 1 through 8 which identifies the time code when access is to be permitted for this particular individual. The signal on line 89 enables the gate indicating that the user's identification number is stored in memory.

It can be seen that the signal on line 89 is used to enable the gate 93 to access the time code data to the real-time sensor 51. Except on rare coincidences, the line 89 will not provide a signal, however, until a search for this identification number has been completed.

A search is accomplished as follows. In all cases, the address buffer 77 is initially accessed to the center location of the memory 49. This is accomplished by a shift register 95 which includes nine bit positions, eight of which are filled by consecutive zeroes and one of which 5 is filled by a one. The binary 1 is in the most-significant bit position at the beginning of any data search. Thus, the binary number 1,0,0,0,0,0,0,0,0 is accessed on a line 97 from the shift register 95 and ORed in a gate 99 with a temporary address buffer 101 which, at the beginning of the search, stores the nine-digit binary number 0,0,0,0,0,0,0,0,0. This address is supplied to the address buffer 77 and selects the center position in the memory 49. In response to this accessing, the data buffer 79 is supplied with the center word in the memory 49, and 5 this word is automatically compared with the identification number from the card data buffer 47. If the identification number, accessed at this central point from the memory 49, is smaller than the card identification number from the buffer 47, a signal will be produced on line 85 which will enable a gate 103 to supply the data from the address buffer 77 to the temporary address buffer 101. The temporary address buffer 101 in this instance will contain the word 1,0,0,0,0,0,0,0,0, designating the center location in memory 49. The signal on line 85 is also supplied through an OR gate 105 to a delay 107 which in turn clocks the shift register 95.

The shift register 95 is made recirculating by the connection 108, and the 1 in the most-significant bit position is thus clocked to the second most-significant bit position. If, on the other hand, the number accessed at the central location in the memory 49 is larger than the identification number from the buffer 47, a signal will be produced on line 87 which will recirculate (using gate 105 and delay 107) by one bit the shift register 95, but will not enable the gate 103. The number in the address buffer 77 will thus not be supplied to the temporary address buffer 101.

This searching routine continues so that each time that the comparator 83 produces a plus or minus output signal on line 85 or 87, the binary number in the shift register 95 is circulated by one count. The circulated number in this register 95 is ORed with the temporary address buffer 101, to change the address buffer 77 and thus address a new location in the memory. At the same time, the temporary address buffer is supplied with the additional digit from the shift register 95 only if the output from the comparator 83 indicates that the data is at a higher address location in the memory 49. Thus, the search continues, one bit at a time, in a normal binary search fashion. At each step, the next most-significant bit of the address buffer 77 is made a one if the data is at a higher address in the memory 49. Alternatively, the next most-significant bit of the address buffer 77 is made a zero if the data is at a lower address in the memory 49. This selective addressing is accomplished by either enabling or not enabling, respectively, the gate 103. Ultimately, this search process will locate the position in memory 49 at which the data from the buffer 47 should be stored, and if such data is stored in the memory 49, the data buffer 79 will store the same card identification number as is accessed on line 81, so that a zero signal will be produced on line 89 to gate the time code to the real-time sensor 51. Alternatively, if the search is completed, so that a binary one exists in the least-significant bit position of the shift register 97, this bit will be shifted on the last signal from the delay 107 to the most-significant bit position. As the one digit is thus shifted by the line 108, it is coupled by line 109 to temporarily disable a gate 111 which temporarily prohibits signals from the OR gate 105 from again actuating the shift register 95, and the search is thus terminated. This same signal on line 109 is used to clear the temporary address buffer 101.

If the search terminates without a zero signal being provided on line 89 from the comparator 83, no signals are produced which will enable the gate 93, and access will not be permitted to the card holder. Obviously, at any time during the search that a zero signal is produced, the search stops, since no signal is supplied to the OR gate 105, and access is immediately permitted if the time of day code compares favorably with the real time, as will be explained in more detail below.

The remainder of the circuitry associated with the memory control circuit 63 is utilized primarily for programming the memory 49 to add or delete identification numbers from the memory 49 or to search the memory 49 for programming purposes, so that the system user may provide access at this remote location for only selected personnel. As previously explained, a supervisor's card is utilized to provide program access, and this access supplies keyboard data from the program access control circuit 67 to a buffer 113, shown in FIG. 2. In a number of cases, the programmer will utilize the keyboard to place an identification number in the buffer 113, followed by a code indicating the operation to be conducted. Thus, for example, the programmer may place an identification number in the buffer 113 and utilize an additional keystroke to indicate that this identification-number is to be inserted into the memory, so that an additional employee will be granted access. Alternatively, the additional keystroke may be used to delete this number from memory or simply to search the memory for this member. In some cases, only a single keystroke is used, as, for example, when the programmer wishes to simply increment or decrement the memory address register 77.

Whenever signals are present on line 67 indicating that program access control has been granted, a line 115 coupled to line 67 enables a display 117, the first five digits of which, that is, the identification number digits of which, are provided by the buffer 113. The last digit, reserved for the time code digit from the memory 49, is supplied by the line 91 to the display 117. Thus, the programmer can see the identification number that the keys into the buffer 113, but his last keystroke which indicates the operation he wishes to perform, will not operate the display 117. Rather, the last keystroke will begin a search or other operation which will result in dam being placed in the data buffer 79. Ultimately, the last digit of the display 117 will indicate the results of the search or other step by displaying the last digit from the data buffer 79.

The identification number from the buffer 113 is coupled by a line 119 to the comparator 83, while the least-significant bit is coupled by a line 121 to a plurality of comparators. If the least-significant keystroke identifies a memory address incrementing step, data identical to the keystroke is supplied by a buffer 123 so that a comparator 125 supplies a signal on line 127 to an adder 129 which adds unity from a register 131 to the current value of the address buffer 77, as supplied on line 133, and supplies the sum back to the address buffer 77 on line 135. Thus, each time that this keystroke is entered, the address in register 77 is incremented by one location, as required by the programmer. In a similar fashion, a decrementing keystroke will compare favorably in a comparator 137 with data from a buffer 139 to provide a signal on Mine 141 to add a minus one in a buffer 143 to the value in the address buffer 77, as accessed on line 145, so that an adder 147 provides on line 149 a decremented address, permitting the programmer to decrement the memory location address in register 77 for programming purposes.

If the programmer utilizes a keystroke which requires a search of the memory 69, after first introducing an identification number into the buffer 113, a search routine will be implemented which will search the memory 49 to determine whether the identification number in the buffer 113 exists in the memory 49 and, if so, during what time zones that individual is allowed access. This is accomplished by first comparing the keystroke data with a search keystroke indication in a buffer 151, that a comparator 153 provides a signal on line 155 to enable a gate 157 which supplies the identification number from the butter 113 to the comparator 83. The comparator 83 then initiates a search routine in a binary fashion, as previously described, to ultimately provide on lines 91 the decimal digit indicating the time access code for this particular identification number, which time access code will be displayed on the display 117 along with the identification number which was searched. If the identification number is not in the memory 49, a zero output signal on line 89 will not be produced by the comparator 83, and the gate 93 will not be enabled. Thus, no display will appear in the least-significant bit position of the display 117. Alternatively, the system could be designed to provide a zero in the least-significant bit position of the display 117 if the searched identification number is not present in the memory 49.

If, as the least-significant bit after the insertion of an identification number in the buffer 113, the programmer depresses a key which provides an instruction to insert this identification number as a new or additional identification number in the memory 49, a comparator 159 will provide an output signal because of identity between the keystroke data and data from a buffer 161, the signal being provided from the comparator 159 on line 163 to initiate the operation of a counter 165. This operation is initiated by placing the pulse on the clocking input 167 of the counter 165 so that the counter counts to its first position, placing an output signal on a 1 count line 169. When a signal is present on line 169, a comparator 171 compares a delimiter register 173 with a register 175 which stores a count equivalent to the last storage location in the memory 49. The delimiter register 173, as will be understood through the following description, is continuously updated so that it stores a number equal to the number of words stored in the memory 49. When the number in the delimiter register 173 is equal to the number stored in the register 175, this is an indication that the memory 49 is full and the comparator 171 will produce a signal on line 177 to energize a front panel display 179 indicating to the programmer that the memory is full, and that no additional identification numbers should be inserted without first deleting some identification numbers. Furthermore, the full memory indication is not connected to clock the counter 165, so the insert routine will not continue.

If the memory 49 is not full, the comparator 171 will produce a signal on line 181 indicating that the registers 173 and 175 did not store equal numbers. This signal on line 181 is used for clocking the counter 165 to its second count position, producing a signal on line 183. The programmer will have been told that, prior to an insert operation, a search operation should be conducted using the comparator 153 so that, at the time the insert operation is conducted, the address buffer 77 will be addressing the memory 49 at a location immediately preceding or immediately following the location where the new identification number should be inserted. At the end of the search routine, the comparator 83 will provide a plus signal on line 85 if the new data word should immediately precede the present location of the address buffer 77 or a minus signal if it should immediately follow this word. During the insert routine, the output lines of the comparator 83 are checked at the second clock position by ANDing the line 183 in gates 185 and 187 with the minus line 87 and plus line 85, respectively, from the comparator 83. If the minus line 87 contains a logic signal, the AND gate 185 produces an output signal on line 189 to again clock the counter 165 to produce an output signal on its 3-count line 191. If, on the other hand, the plus line 85 is at a positive level, the AND gate 187 will provide a signal on line 193 to a buffer 195 enabling that buffer 195 to input on a plurality of lines 197 to the counter 165 a 6-count, so that the counter 165 will jump from its 2-count position to its 6-count position. This latter step is necessary so that if the new data word is to be stored at the next data position in memory 49 (a plus signal on line 85), a routine will be implemented which skips a data position in the memory 49. If, on the other hand, the present data position where the address buffer 77 presently points is not to be skipped (since the new data word is to go at this present position), the next series of steps between count 2 and count 6 of the counter 165 are used for removing and temporarily storing the presently addressed word from the memory 49, as will be seen from a description of these steps.

When the signal on line 189 clocks the counter 165 to its three count, the signal on line 191 enables a gate 194 so that data from the data buffer 79 is accessed in parallel to a temporary storage buffer 196. This step is used to save the identification number in the current memory location. It will be seen as this description follows that the current memory location is stored in the next lower memory location, while the word from that lower position is, in turn, stored in the next succeeding lower position. Thus, when a new word is placed in memory 49, the counter 165 is used to sequence a repeating routine which shifts the remaining data in the memory 49 toward the bottom of the memory 49 by one step, making room at the proper location in numerical order for the newly added data word.

Once the current identification number has been stored in the temporary register 196, a delay 198 connected to the line 191 is used to clock the counter 165 to its 4-count position. This 4-count position provides a signal on line 201 which enables a gate 203 connecting the buffer 113 to write logic 205 associated with the memory 49. Thus, at count 4, the data previously stored in the current memory location is automatically erased and the new identification number is written in this storage location. A delay circuit 207 connected to the line 201 is used to again clock the counter 165 at the completion of this writing operation so that the counter produces a 5-count output on line 211 which accesses the data word from the temporary buffer 196 into the buffer 113, erasing the number previously stored in the buffer 113, by enabling a gate 213 interconnecting these buffers. This places the number previously stored in the memory 49 (which was removed to make room for the new word) into the buffer 113, so that, on the next circulation of the counter 165, it can be written into the next successive location in the memory 49.

Figure 3:
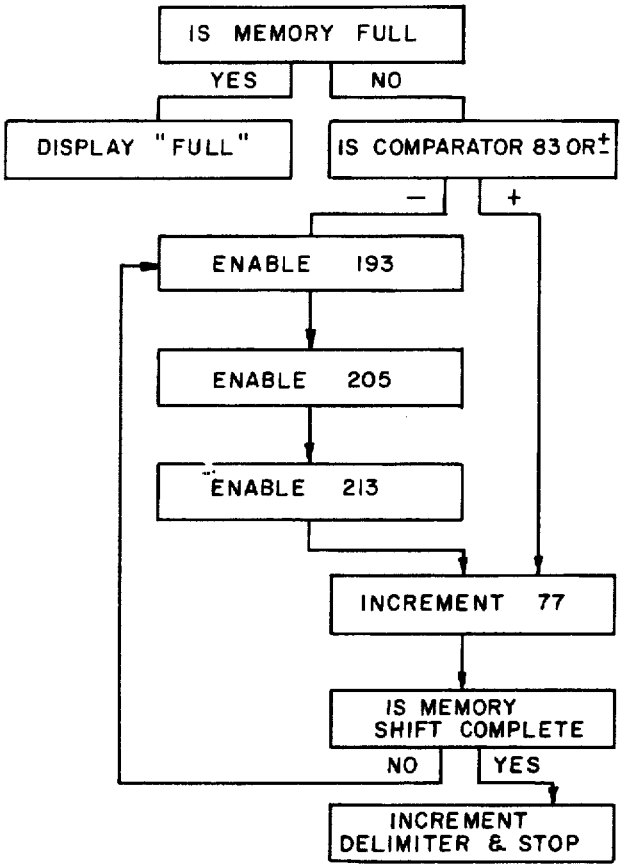
FIG. 3 is a flow chart showing the operation of an insertion loop counter and its associated electronic elements, all of which are shown in FIG. 2.

A delay 215 connected to line 211 clocks the counter 165 after the data has been accessed into the buffer 113 and the counter 165 then provides a 6-count output on line 217 which is connected to line 127 to increment the addressed location in the memory 49 as previously described. The line 217 is additionally connected through a delay 219 to clock the counter 165 to its seventh and final output position. It will be recognized that, at the sixth count position, the signal on line 217 incremented the memory 49 location so that the next successive memory word is being accessed. This memory word should be larger than the word currently in the buffer 113, unless we have reached the end of the data in the memory 49, in which case the new word would be 0,0,0,0 and thus smaller than the word stored presently in the buffer 113. Thus, the signals on lines 85 and 87 can be utilized to determine whether the insert routine should stop. The signal on line 221, indicating count 7, is ANDed with the signal on line 85 in AND gate 223 and with the signal on line 87 in AND gate 225. If the AND gate 223 produces an output signal, this signal is connected to an incrementing circuit 227 which is, in turn, connected to increment the delimiting register 173 adding one count to this register. If, on the other hand, the memory transfer operation has not been completed, the output signal from gate 225 will be used, through a delay 229, to clock the counter 165 back to its 3-count position by utilizing a 3-count register 231 to place a count of three in the counter 165. Thus, the sequence continuously loops through counts 3 through 7 until each of the words in the memory 49 has been shifted down one count, and the delimiter register 173 has been incremented. This entire insert routine is shown in the flow chart of FIG. 3. It can be seen from that low chart that each element of memory data is shifted toward the end of the memory by one position to make room for the new element. The delimiter is then incremented and the process comes to a stop.

Figure 4:
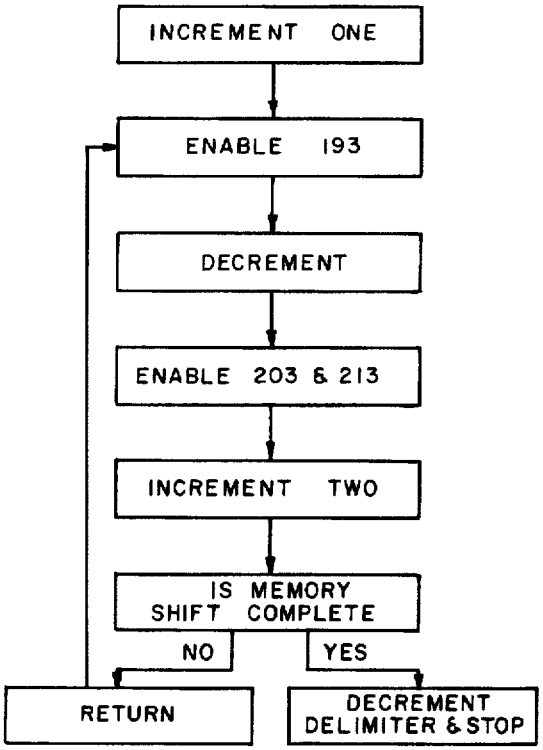
FIG. 4 is a flow chart showing the sequential operation of a deletion loop counter and its associated electronics, all as shown in FIG. 2.

A similar process is generated by a keyboard keystroke which provides on line 121 a delete signal which compares favorably with a delete word stored in a buffer 233. This sequence is shown in the flow chart of FIG. 4 and can be followed there as well as in the schematic diagram of FIG. 2. Signals from the comparator 238 connected to the buffer 233 indicate that a keystroke demanding a dam element deletion from the memory 49 has been made. This signal on line 237 is used to provide the initial input to a counter 245 used to sequence the deletion process. During the data deletion process, it is desired to delete the element of data located during a search operation and to shift all of the remaining data within the memory 49 to close the gap. Thus, the remaining data in the memory 49 must be moved up in the memory by one data position, and the delimiter 173 must be decremented by one count.

This is accomplished by utilizing the signal on 237 to initially increment the address buffer 77 by providing a signal on line 127. A delay 239 is used to assure that this incrementing has been accomplished, and then provides a signal on line 241 to enable a buffer 243 storing a 2-count to input this 2-count into the counter 245 used for sequencing the deletion process. In response to the 2-count from the buffer 243, the counter 245 provides a 2-count output on line 247 which reads the data word at the incremented location into the temporary buffer 196 by enabling gate 194. In addition, through a delay 249, the signal 247 increments the counter 245 at its clocking input 251. The counter 245 then provides a 3-count output on line 253 which is connected to line 141 to decrement the address in the buffer 77. Line 253 is additionally connected through a delay 255 to clock the counter 245 to a 4-count position producing a signal on line 257. This signal is used to enable gates 213 and 203 to access the data from the temporary buffer 195 to the write logic 205. This logic 205 then writes the word in the temporary buffer 195 into the memory location addressed by the buffer 77 in the memory 49. The signal on line 257, in addition, provides a delayed output from a delay circuit 259 to clock the counter 245 to its 5-count position which provides a signal on line 261. Line 261 is connected to the line 127 to increment the address buffer 77. This signal is also delayed in a delay circuit 263 to provide an additional clocking input to the counter 245. In response to this additional clocking input, the counter 245 provide a 1 output on line 267 which is connected to line 127 to increment the address buffer 77 a second time, and is additionally ANDed in gates 269 and 271 with the plus signal 85 and minus signal 87. If a minus signal 87 is present, the end of search has been reached and the delimiter register is decremented by decrementer 272. If a plus signal is present, the gate 269 provides, through a delay 273, a clocking input to the counter 245 to repeat the data shifting process on the next data word. It can thus be seen that the counter 245 is used to sequence a repeating cycle of steps which are used as a looping function to shift all of the data words in the memory one step toward the beginning of the memory in order to close the gap in the memory which results from deleting a data word therefrom. The flow chart of FIG. 4 diagrams this process utilizing element numbers from the schematic of FIG. 2.

When, in the course of a searching operation, an identification number is located, it was explained previously that the data buffer 79 provides, through gate a 4-bit output indicating the time of day when access is to be provided for the person having this identification number. This number is accessed by the real-time sensor 51 which, as shown in FIG. 2, includes three separate clocks, 301, 303, and 305, each of which can provide the closure of switch in response to a particular time of day setting. Thus, for example, the clock 301 may be set to provide a switch closure from 8:00 A.M. to 5:00 P.M., the clock 303 from 5:00 P.M. to midnight, and the clock 305 from midnight to 8:00 A.M. These three clock switches are accessed to a comparator 307 which is, in turn, provided with signals from the gate 93. If the signals from gate 93 conform to the switch closures from the clocks 301 through 305, access is permitted by placing a signal from the comparator 307 on line 309 to gate 53. In a typical arrangement, the comparator 307 will provide an output signal on line 309 if any one of the clock 301–305 is providing a switch closure and the signal from gate 93 has a 1-bit on the corresponding line indicating that this employee is to be provided access at the time of day indicated by this switch closure. It can be seen that by setting the clocks 301–305 and by giving a particular employee access at combinations of times from 1, 2, or 3 of these clocks, total flexibility in timing control can be achieved. Furthermore, by providing a time code on the fourth line from the gate 93, the comparator 307 can be made to provide an output signal on line 309 at any time of day, irrespective of the condition of the clocks 301 through 305, so that, for example, supervisory personnel can be granted access at all times.

Referring once again to FIG. 1, it bears repeating that the remote terminal 13 of the present invention will operate utilizing its own memory 49 and memory control 63 in the manner described. Alternatively, this same remote unit can be utilized by accessing data directly from the buffer 47 through the degraded mode sensor 42, shown in FIG. 1, and comparable so that described in patent application Ser. No. 830,002, filed Sept. 1, 1977, and referenced above. This degraded mode sensor 42 will limit access at this remote terminal in accordance with data stored in the memory 69 in the main processing unit 11 until such time as the communication lines are degraded. At that time, the memory 49 and its memory control 63 will be utilized for limiting access. It can be seen, therefore, that the terminal 13 of the present invention can be used either as a stand-alone terminal by bypassing the degraded mode sensor 42, or may be used as a remote terminal with a central processor system 11, utilizing the degraded mode sensor 42 to impose stand-alone operation only if data lines are degraded.

The present invention permits the same data to be stored in the memory 69 and the memory 49 so that, even during degraded mode operation, although one of the printer 75 may be lost (so that personnel flow data is no longer available), nevertheless the same limited number of personnel may be granted access at this remote location, so that security is not degraded.

Figure 5:
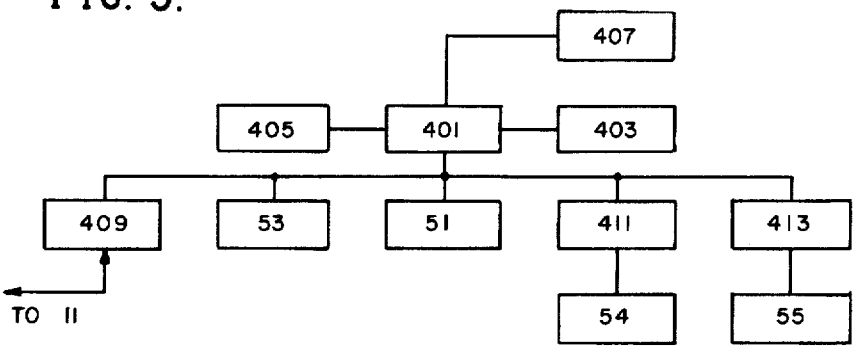
FIG. 5 is a schematic block diagram illustration of a programmable microprocessor system utilizing a program as included in this application for accomplishing the same basic functions provided by the hardwired embodiment of FIGS. 1–4.

The preceding embodiment described in reference to FIGS. 1 through 4 is illustrative of a hardwired circuit for performing the functions of the present invention. In the preferred embodiment, the functions of the remote units 13 are performed by a microprocessor, as illustrated in FIG. 5. This microprocessor includes a central processing unit 401, such as a Motorola 6800, which is connected with a memory unit 403, such as an AMI Model SF101. In addition, a scratch pad memory 405 can provided, such as a Motorola 6810. The central processing unit 401 is also connected to a read only memory 407 in a typical fashion to store the control steps for the central processing unit.

As is typical, the central processing unit 401 interfaces with a communication interface unit, such as a Motorola 6850, 409, for communicating with the central processor 11, and may interfere, in addition, with the card sensor 43 and real-time sensor 51, similar to those shown in FIG. 1. A peripheral interface adapter 411, such as a Motorola 6820, is used to connect the central processing unit 401 to the door access control 54, such as a door strike. The keyboard 55 of FIG. 1 may also be connected to the central processing unit 401 through the main data and control bus 413.

It will be recognized by those skilled in the art that the data processing unit, shown in FIG. 5, is typical of many other similar data processing units. What makes this processing unit unique is a program stored in the read-only memory 407 for controlling the operation of the central processing unit 401. This program, written for the Motorola 6800, is as follows:

```
                ;  DELAY COUNTERS
                ;
                ;
                ;  THESE TWO BYTE COUNTERS ARE INCREMENTED
                ;  ON EVERY CLOCK TICK.  WHEN ONE OF THEM
                ;  CLOCKS TO ZERO, THE ASSOCIATED COMPLETION
                ;  ROUTINE IS CALLED.
                ;
                ;  IF A COUNTER IS ZERO, IT STOPS
                ;  THIS TABLE RUNS PARALLEL TO 'SERV'
                ;>>>>THE ORDER OF THE ENTRIES IS CRITICAL!!!
                ; E.G. ASCNTR MUST BE SIXTH BECAUSE OF THE CNTDN KLUDGE
                ;
        0000Z CNTRS       =       *
0000            CPCNTR:   BLOCK   2       ;(!) SET BY OPEN; WAKES GOON
0002            GOCNTR:   BLOCK   2       ;(!) SET BY GOON; WAKES GOOFF
0004            GXCNTR:   BLOCK   2       ;(!)SET BY GOON, GXOFF; WAKES
                          GXOFF
0006            EDCNTR:   BLOCK   2       ;SET BY COMCON;WAKES EDEND
0008            ERCNTR:   BLOCK   2
000A            ASCNTR:   BLOCK   2       ;(!)SET BY GOOFF; WAKES
                          RLYOFF(20)
```

```
000C        DUCNTR:    BLOCK   2
000E           BLOCK   2        ;FOR PATCHING
            ; NOTE:    (!) MEANS CLEARED BY NOTIME
            ;***
      0010  NCNTRS     =        *-CNTRS ;NUMBER OF **BYTES** OF
                       COUNTERS

            ;
            ;  STATE FLAGS
            ;
            ;
            ;  SOME BYTES TO INDICATE THE CURRENT MACHINE
            ;  STATE AND THE RESULTS OF PROCESSING A CARD
            ;  ENTRY.

            ;
0010        APBFIG:    BLOCK   1
0011        CRDFLG:    BLOCK   1
0012        EDMODE:    BLOCK   1        ;SET MEANS WE ARE EDITING
0013        OHFLG:     BLOCK   1        ;1 MEANS OPEN HOUSE
            ;
```

```
                ;
                ;
                ; KEYBOARD DATA TABLES
                ;

0014            KEYTAB:     BLOCK   5       ;INPK OF EDIT INPUT
0019            KEYZON:     BLOCK   1       ;SIXTH EDIT DIGIT
001A            KEYPTR:     BLOCK   1       ;ALWAYS ZERO
001B            KEYCNT:     BLOCK   1
001C            DURESP:     BLOCK   1
001D            CMDBYT:     BLOCK   1       ;ZERO OR KEYBOARD CMD
001E            POISON:     BLOCK   1       ;WIPE OUT DISPLAY
                ;           ;ON NEXT NUMERIC KEY
001F            KEYFLG:     BLOCK   1       ;WEVE SEEN THIS KEY BEFORE
0020            OLDKEY:     BLOCK   1       ;FF OR LAST KEY SEEN
                ;
0021            MASTER:     BLOCK   4               ;CARD DIGIT INDICES
0025            MASHER:     BLOCK   4       ;"""  BUT UNPERMUTED
0029            MATCH:      BLOCK   1
                ;
                ; CARD DATA BUFFER
                ;
002A            DIGTAB:     BLOCK   8       ;DIGITS READ FROM CARD
0032            ENDMEM:     BLOCK   2       ;FIRST ADDR NOT IN CMOS MEMORY
0034            DISDIG:     BLOCK   3       ;SEARCH COMPARAND
0037            EDTPTR:     BLOCK   2       ;FIRST BYTE OF 'THIS' RECORD
0039            EDTZON:     BLOCK   1  ;TIME ZONE OF 'THIS' RECORD
                ;  ZERO MEANS EDTPTR POINTS TO INVALID RECORD
```

```
                ;
                ;  ERROR RETRIES IL AND COUNT
                ;
003A            RTIBUF:     BLOCK   5

003F            NTRIES:     BLOCK   1
                ;
                ;  XREG
                ;
                ;
                ;  SAVE AREAS FOR X BECAUSE YOU CAN'T
                ;  SAVE IT ANY OTHER WAY
                ;
0040            XREG0:      BLOCK   2
0042            XREG1:      BLOCK   2
0044            SCNPTR:     BLOCK   2
0046            DIGPTR:     BLOCK   2
0048            COMBX:      BLOCK   2
004A            MIXPTR:     BLOCK   2
004C            MUXPTR:     BLOCK   2       ;POINTS TO DIGIT TO BE
                            DISPLAYED
004E            MUXTMP:     BLOCK   1
                ;
```

```
                ;
                ;  EPROM AND I/O ADDRESSES
                ;
                ;
                ;
        0080    EPROM       =       $80
        0084    SCNTAB      =       $84     ;COIL ADDR TABLE

                ;
        00A4    BUFA        =       $A4     ;PIA COIL ADDRESSES
        00A5    CSRA        =       BUFA+1
        00A6    BUFB        =       BUFA+2  ;PIA RELAYS
        00A7    CSRB        =       BUFA+3
                ;
        00A8    ACSTAT      =       $00A8   ;ACIA STATUS PORT
        00A9    ACDATA      =       ACSTAT+1        ;ACIA I/O PORT
                ;
        00E0    ROW0        =       $00E0           ;KEYBOARD SWITCH ROW
                ; DIP SWITCH ADDRESSES
00C3            ASECT   $00C3
00C3            S.XXX:      BLOCK   1       ;EXTERNAL SENSOR SWITCHES
00C4            S.COMB:     BLOCK   1       ;PERMUTATION & COMBINATION
00C5            S.SYS:      BLOCK   1       ;SYSTEM CODE
        00C6    S.AS        =       *       ;AS/DOD TIMER COUNT
00C6            S.VTD:      BLOCK   1       ;VTD TIMER COUNT
```

```
                ;
                ; CMOS MEMORY ASSIGNMENTS
0000               VSECT
0000            SUM:        BLOCK   2       ;CHECKSUM OF REST OF CMOS
0002            FOX:        BLOCK   3       ;ID OF PERSON ALLOWED TO
                            EDIT MEMORY
0005            ENDPTR:     BLOCK   2       ;FIRST BYTE AFTER VALID
                            MEMORY
0007            CMOS:       BLOCK   3*5     ;ALLOW FIVE ENTRIES
        0016V   END1        =       *       ;FIRST ADDR NOT IN CMOS
0016               BLOCK    3       ;AND ONE MORE
        0019V   END2        =       *
0000               PSECT
                ;
                ; KLUDGEY LINKS TO FOREGROUND MODULE
                ;
0000            RTC:        BLOCK   3
0003            OPEN:       BLOCK   3
0006            BLANK:      BLOCK   3
0009            RIYON:      BLOCK   3
                ;
        0006P   RUBOUT      =       BLANK
                ;
                ;  RESET AND INTERRUPT VECTORS
                ;
0FF8               ASECT    $0FF8
0FF8               WORD     RTC     ;REAL TIME CLOCK
0FFA               WORD     $FC04   ;SWI TO KERNEL
```

```
;
;  BIT MASKS, ETC.
;
;**********
;
; FIRST, THE OPTION BITS
; THESE SYMBOLS ARE USED TO REFER TO BITS IN
; THE OPTION BYTES
;
;** FIRST OPTION BYTE

0040  O.OH      =      $40     ;OPEN  HOUSE MODE
0020  O.AS      =      $20     ;ALARM SHUNT
0008  O.BIG     =      $08     ;LARGE CMOS MEMORY
0002  O.TZ      =      $02     ;TIME ZONE INPUTS
0001  O.IDEK    =      $01     ;WE ARE AN IDEK READER
      ;** NOW FOR THE SECOND BYTE OF OPTIONS
0040  O.ERAN    =      $40     ;ERROR ANNUNCIATOR
0020  O.DUR     =      $20     ;DURESS RELAY
      ;
      ; NOW FOR THE RELAY BITS
      ;
0080  R.GO      =      $80
0040  R.DUR     =      $40     ;DURESS RELAY
0020  R.AS      =      $20     ;ALARM SHUNT
0010  R.ERAN    =      $10     ;ERRAN
```

```
        ;
        ; NOW FOR THE EXTERNAL SWITCHES
        ; (THESE ARE BITS WITHIN THE WORD S.XXX)
        ;
0001    X.ICK       =       $01     ;CLOSED=ZERO=CARD ONLY
        ;X.TRIES    =       $06     ;NTRIES SWITCH INPUTS
0008    X.FOX       =       $08     ;STORE NEXT CARD AS FOX

        ;X.TZ       =       $70     ;TIME CLOCK INPUTS
0080    X.AS        =       $80     ;SHUNT REQUEST PUSHBUTTON
                      SWITCH

        ;
        ;
        ;  DELAY TIMES
        ;

        ;
        ;  THE COUNTER/TIMERS IN THE FOREGROUND ROUTINE
        ;  ARE CLOCKED ONCE EVERY 3.33
        ;  MILLISECONDS (300 TIMES A SECOND).
        ;  EACH COUNTER IS A TWO BYTE COUNTER, AND
        ;  IS INCREMENTED ON EACH CLOCK TICK.
        ;  TIMEOUT OCCURS WHEN COUNTER OVERFLOWS
        ;  TO ZERO.
        ;
        ;
FFF0    T.50MS      =       -16     ;50 MILLISECONDS
FED4    T.01S       =       -300    ;1 SECOND
FC7C    T.03S       =       -900    ;3 SECONDS
F448    T.10S       =       -3000   ;10 SECONDS
DCD8    T.30S       =       -9000   ;30 SECONDS
B9B0    T.60S       =       -18000  ;ONE MIN
        ;
```

```
;
;  BACK
;
;
;  THIS IS THE CONTROLLING PROGRAM FOR THE
;  BACKGROUND TASKS.  MOST OF THE EXECUTION
;  TIME OF THE PROCESSOR IS SPENT IN THIS
;  ROUTINE CHECKING STATUS BITS
;  AND WAITING TO BEGIN ONE OF SEVERAL
;  BACKGROUND TASKS.  THE FOLLOWING
;  TASKS ARE INITIATED FROM THIS ROUTINE:
;
;  1.  INITIATE RESPONSE TO CONSOLE INQUIRY
;  OR COMMAND.
;
;  2.  CHECK FOR CARD, OPEN DOOR IF OK
;
;  3.  CHECK FOR MASTER CARD, ACCEPT PROGRAMMING
        COMMANDS
;
```

```
                TITLE   "BACK"
000C            PSECT
            ;
000C 8E 0068 START:     LDS     #$0068          ;INIT STACK PTR
000F BD 0197    JSR     IOSET   ;INITIALIZE I/O DEVICES
0012 BD 018C    JSR     CLRRAM  ;INITIALIZE MACHINE STATE
            ;
0015 CE FFFF    LDX     #$FFFF
0018 DF 80      STX     PPROM   ;ENABLE ALL FEATURES
            ; DETERMINE MEMORY SIZE

001A CE 0016    LDX     #END1
001D 96 80      LDAA    PPROM
001F 84 08      ANDA    #O.PIG
0021 27 03 =    BEQ     ENDMMS
0023 CE 0019    LDX     #END2
0026 DF 32Z ENDMMS:     STX     ENDMEM
            ;
0028 BD 0401    JSR     CHKSUM  ;IS CMOS OK?
002B 27 09 =    BEQ     SUMOK
002D 7F 0004    CLR     FOX+2   ;WIPE OUT PART OF FOX
0030 BD 03AE    JSR     IOCLR   ;WIPE OUT REST OF CMOS
0033 BD 0412    JSR     SETSUM  ;SUM OK NOW!
        0036P SUMOK     =       *
            ;
0036            PION            ;TURN ON INTERRUPTS
            ;
```

```
                ;
                ; MAIN BACKGROUND LOOP
                ;
        2037F BACK        =        *

0037 86 34        LDAA     #$34
0039 97 A5        STAA     CSRA     ;WAKE UP DEADMAN
003B 96 11Z       LDAA     CRDFIG

003D 81 01        CMPA     #$01     ;NEW CARD?
003F 26 F6 =      BNE      BACK

                ; HERE WHEN WE GET A NEW CARD
0041 BD 01B6      JSR      CARDRD
0044 BD 02B5      JSR      PAKARD   ;CONDENSE INTO DISDIG
                ;
0047 BD 041C      JSR      CHKSYS
004A 26 4C =      BNE      ERROR    ;BAD SYS CODE
004C BD 042D      JSR      FRTL     ;SEE IF NEW PERSON TRYING
                ;
004F 96 C3        LDAA     S.XXX
0051 84 08        ANDA     #X.FCX   ;NEW MASTER?
0053 27 4C =      BEQ      NEWFOX   ;YES....DO NOT OPEN DOOR, THOUGH
                ; SEE IF WE SHOULD GO INTO EDIT MODE
0055 BD 0250      JSR      CHKFOX
0058 26 03 =      BNE      *+5
005A 7E 00F8      JMP      NEWED    ;YES, SIR!
                ; HERE IF ORDINARY ENTRY ATTEMPT
005D 86 34      BCK:       LDAA     #$34     ;KEEP DEADMAN FROM TRASHING US
005F 97 A5        STAA     CSRA
0061 96 11Z       LDAA     CRDFLG   ;LEAVE LOOP IF CARD REMOVED PREMATURELY

0063 27 D2 =      BEQ      BACK
```

```
0065 BD 00AD    JSR     CHKIDK  ;EXAMINE IDEX PASSWORD
0068 27 F3 =    BEQ     BCK     ;NOT READY YET
006A 25 2C =    BCS     ERROR   ;HE FIUBBED HIS PASSWORD!
            ;
006C 96 13Z     LDAA    OHFLG
006E 26 19 =    BNE     LETIN   ;TODAY IS OPEN HOUSE
            ;
0070 BD 0207    JSR     FIND            ;COMPARAND IN DISDIG ALREADY
            ; HERE WITH APPROPRIATE TZ IN EDTZON
0073 96 C3      LDAA    S.XXX   ;READ TIME ZONE INPUTS
0075 44         LSRA
0076 44         LSRA
0077 44         LSRA
0078 44         LSRA
0079 84 07      ANDA    #$07    ;TZ INPUTS IN 3 LSBS
007B 8A 08      ORAA    #$08            ;SUPER TIME ZONE ALWAYS ON
            ;
007D D6 80      LDAB    FPROM
007F C4 02      ANDB    #O.TZ   ;DID HE PAY FOR TIME ZONES?
0087 27 0F =    BEQ     ERROR   ;NOT ALLOWED AT THIS TIME
            ; HERE AFTER WE HAVE RUN THE ENTIRE GAUNTLET
            ; ALL IS OK, LET HIM IN
0089 86 FE  LETIN:  LDAA    #$FE    ;MEANS CARD PROCESSED
008B 97 11Z     STAA    CRDFLG
008D BD 044A    JSR     DURESS
0090 BD 0003    JSR     OPEN
0093 7F 003F    CLR     NTRIES
0096 20 9F =    BRA     BACK    ;GO WAIT FOR NEXT CARD
```

```
                ;
                ; HERE WHEN WE DECIDE THAT WE WILL NOT LET THIS GUY IN
        0098P ERROR      =        *
0098 86 FE        LDAA     #$FE     ;WERE THROUGH WITH THIS CARD
0
 009A 97 11Z      STAA     CRDFLG
009C BD 00CE      JSR      ERRTRY   ;PULL IN ERRAN IF TOO MANY TRIES
009F 20 96 =      BRA      BACK
                ;
                ; HERE WHEN THE NEW BOX CARD IS PUT IN
        00A1P NEWBOX     =        *
00A1 86 FE        LDAA     #$FE
00A3 97 11Z       STAA     CRDFLG   ;WE ARE THROUGH WITH THIS CARD
00A5 BD 023B      JSR      SETBOX
00A8 BD 0412      JSR      SETSUM   ;FIX UP CHECKSUM
00AB 20 8A =      BRA      BACK
                ;
                ; ROUTINE TO CHECK IDEK PASSWORD
                ; RETURNS WITH Z SET IF NOTT READY
                ; RETURNS WITH C SET IF HE GOT IT WRONG

                ; BOTH CLEAR IF ALL OK
        00ADP CHKIDK     =        *
00AD 96 80        LDAA     EPROM
00AF 84 01        ANDA     #O.IDEK
00B1 27 17 =      BEQ      HAPPY    ;NOT AN IDEK READER!
                ;
```

```
00B3 96 C3        LDAA    S.XXX

00B5 84 01        ANDA    #X.ICK   ;CARD+ KEYBOARD?
00B7 27 11 =      BEQ     HAPPY    ;NO, CARD ONLY
                ;
00B9 96 1BZ       LDAA    KEYCNT
00BB 81 04        CMPA    #$04     ;THERE ARE 4 DIGS IN A PASSWORD
00BD 2B 09 =      BMI     NOIDEN   ;NOT ENUF YET
                ;
00BF BD 045F      JSR     COMBIN
00C2 25 06 =      BCS     HAPPY
                ; HERE IF BAD IDEK
00C4 86 01        LDAA    #1       ;NOT ZERO
00C6 0D           SEC
00C7 39           RTS
                ; HERE IF NOT READY
        00C8P NOIDEK      =        *
00C8 4F           CIRA
00C9 39           RTS
                ; HERE IF GOOD IDEK
        00CAP HAPPY       =        *
00CA 86 01        LDAA    #1
00CC 0C           CLC
00CD 39           RTS
                ;
```

```
                ;
                ; CALL HERE ONCE FOR EACH ERROR
                ; FULLS IN ERRAN WHEN NTRIES IS USED UP
        00CEF ERRTRY     =       *

00CE 96 81      LDAA    FPROM+1
00D0 84 40      ANDA    #C.ERAN
00D2 27 1A =    BEQ     ETD             ;SAVE OURSELVES A LOT OF WORK
                ;
00D4 7C 003F    INC     NTRIES  ;KEEP COUNT
00D7 96 C3      LDAA    S.XXX   ;GET SWITCH SETTING
00D9 44         LSRA
00DA 84 03      ANDA    #$03
00DC 4C         INCA            ;ZERO ON SWITCHES=ONE TRY
00DD 91 3F2     CMPA    NTRIES
00DF 26 0D =    BNE     ETD     ;STILL TRYING
                ;
00E1 86 10      LDAA    #R.ERAN
00E3 BD 0009    JSR     BIYOM
00E6 7F 003F    CLR     NTRIES
00E9 CE FC7C    LDX     #T.03S
00EC DF 08Z     STX     ERCNTR
                ;
00EE 39         ETD:    RTS
                ;
```

```
                ;
                ; HERE WHEN THROUGH EDITING
        00EFF FINED      =        *
00EF 7F 0012    CLR     EDMODE
00F2 BD 0006    JSR     BLANK
00F5 7E 0037    JMP     BACK
                ;
                ;
                ; MAIN LOOP FOR EDITING MEMORY
                ;
        00F8F NEWED      =        *
00F8 86 FE      LDAA    #$FE
00FA 97 11Z     STAA    CRDFLG  ;HIS CARD IS FINISHED!
                ;
00FC 7C 0012    INC     EDMODE  ;WE ARE NOW EDITING
00FF BD 0182    JSR     BATCMT
0102 CE 0007    LDX     #CMCS

0105 DF 37Z     STX     EDTPTR
0107 CE B9B0    LDX     #T.60S
010A DF 06Z     STX     EDCNTR  ;TURN OFF IF IDLE ONE MIN
010C 7F 0039    CLR     EDTZON
                ;
        010FF EDIT       =        *
010F 86 34      LDAA    #$34
0111 97 A5      STAA    CSRA
0113 7D 0012    TST     EDMODE
0116 27 D7 =    BEQ     FINED   ;LEAVE EDIT MODE
0118 96 1DZ     LDAA    CMDBYT
011A 2F F3 =    BLE     EDIT
011C BD 0129    JSR     COMCON
```

```
011F BD 0412     JSR     SETSUM
0122 CE B9B0     LDX     #T.60S
0125 DF 06Z      STX     EDCNTR
0127 20 E6 =     BRA     EDIT
                ;
                ; COMMAND DISPATCHER
                ; CALL HERE WITH CMD CODE IN A
                ;
        0129P COMCON     =       *
0129 7F 001D     CLR     CMDBYT  ;SO WE WON'T TRY TO DO IT AGAIN
012C 84 0F       ANDA    #$0F    ;STRIP OFF HIGH ORDER BITS
012E 81 0B       CMPA    #$0B    ;BIGGEST CMD IS 0A
0130 2A 3P =     BPL     COMRTS  ;ILLEGAL IGNORE
0132 48          ASLA            ;TWO BYTES TO AN ADDR
                ; AT THIS POINT A CONTAINS 0000XXX0
0133 97 43Z      STAA    XREG1+1 ;LSB OFFSET
0135 86 ??       LDAA    #MSB COMTAB
0137 97 42Z      STAA    XREG1   ;MSB TABLE ADDR
0139 DE 42Z      LDX     XREG1
013B EE ??       LDX     CMTLSB,X        ;LSB TABLE ADDR
013D 6E 00       JMP     0,X
                ;
        013FP COMTAB     =       *
013F             WORD    RUBOUT,UP,C.OH,CIRALL
0147             WORD    DOWN,C.XOH,DELETE,SEARCH
014F             WORD    RUBOUT,QUIT,INSERT.,RUBOUT
        ???? CMTLSB      =       LSB COMTAB
                ;
                ; SERVICE ROUTINE FOR QUIT CMD
0157 7F 0012 QUIT:       CLR     EDMODE  ;BACKGROUND WILL NOTICE FLAG
015A 39          RTS
```

```
                ;
                ; SERVICE FOR OPEN HOUSE CMD
        015BP C.OH        =        *
015B 96 80        LDAA     FPROM
015D 84 40        ANDA     #C.OH
015F 27 21 =      BEQ      BADCMD
                ;
0161 BD 0006      JSR      BLANK
0164 86 01        LDAA     #$01
0166 97 13Z       STAA     OHFLG

0168 97 19Z       STAA     KEYZON   ;SHOW CMD ACCEPTED
016A 7C 001E      INC      POISON
016D 39         COMRTS:    RTS
                ;
                ; SERVICE FOR END OPEN HOUSE CMD
        016EP C.XOH       =        *
016E 96 80        LDAA     FPROM
0170 84 40        ANDA     #O.OH
0172 27 0E =      BEQ      BADCMD
                ;
0174 BD 0006      JSR      BLANK
0177 86 02        LDAA     #$02
0179 97 19Z       STAA     KEYZON
017B 7C 001E      INC      POISON
017E 7F 0013      CLR      OHFLG
```

```
                ; HERE TO RETRUN A CODE OF ZERO
0182 BD 0006 BADCMD:    JSR     BLANK
0185 7C 001E    INC     POISON
0188 7F 0019    CLR     KEYZON

018B 39         RTS
                ;
                ;
                ;
                ;  CLRRAM
                ;
                ;
                ;  CLEARS ALL RAM FROM 0000 TO VAREND
                ;  USED TO INIT RAM ON STARTUP
                ;
018C CE 004F CLRRAM:    LDX     #VAREND
018F 6F 00   CLRRML:    CLR     0,X
0191 09         DEX
0192 26 FB =    BNE     CLRRML
0194 6F 00      CLR     0,X     ;CLEAR BYTE ZERO ALSO!

0196 39         RTS
                ;
```

```
                ;
                ;
                ; I/O INITIALIZATION ROUTINES
                ;
                ;
0197 7F 00A5 IOSET:     CLR     CSRA    ;ROUTING BIT=0 MEANS DDRS
019A 7F 00A7    CLR     CSRB
019D 86 FF      LDAA    #$FF    ;1 MEANS OUTPUT
019F 97 A4      STAA    BUFA
01A1 86 FE      LDAA    #$FE            ;ONE INPUT FOR CARDIN
0
 1A3 97 A6      STAA    BUFB
                ; SET CA2 TO 'MANUAL', LOW=FG, HIGH=FG
                ;  (FOR DEADMAN)
                ; SET CA1 TO REACT TO FALLING EDGE OF COIL DATA
01A5 86 34      LDAA    #$34            ;$3C FOR FOREGROUND
01A7 97 A5      STAA    CSRA
                ; CB2 REACTS TO THE RISING EDGE OF RTC
                ; CB1 IS UNUSED
01A9 86 0E      LDAA    #$0E
01AB 97 A7      STAA    CSRB
                ; NOW SET INITAL VALUES
                ; NO COILS SELECTED, NO RELAYS ON
01AD 86 F0      LDAA    #$F0
01AF 97 A4      STAA    BUFA
01B1 86 0E      LDAA    #$0E
01B3 97 A6      STAA    BUFB
01B5 39       RTS2:     RTS
                ;
```

```
                ;
                ;*****************************************************
                ;
                ;           CARD READER
                ;
                ;*****************************************************
                ;
                ;
                ;  THIS SET OF ROUTINES READS THE MAGNETS,
                ; ASSEMBLES BITS INTO 4-BIT DIGITS
                ; AND STORES THEM ONE TO A WORD AT DIGTAB
                ;
                ;

01B6 CE 0084 CARDRD:    LDX     #SCNTAB ;POINTS AT COIL ADDRESSES
01B9 DF 44Z     STX     SCNPTR
01BB CE 002A    LDX     #DIGTAB
01BE DF 46Z     STX     DIGPTR  ;POINTS TO PLACE TO KEEP THE DIGITS
       01C0P CRDRDL     =       *
                ;
                ; HERE TO READ THE NEXT DIGIT OF THE CARD
                ;

                ;  LDX     DIGPTR
                ;          ;ASSUME X CONTAINS DIGPTR
01C0 8C 0031    CPX     #DIGTAB+7       ;STOP AFTER 7 DIGITS
01C3 26 01 =    BNE     CRDOIT
01C5 39         RTS             ;ALL DIGITS ACCUMULATED
                ;
01C6 C6 10   CRDOIT:    LDAB    #$10            ;WILL CARRY AFTER
                4 ITERATIONS
      01C8P BITRDL      =       *
```

```
                ; HERE TO READ ONE BIT AND INCLUDE IT IN DIGIT
                ;
01C6 BD 01DA    JSR     CRDSCN  ;SCAN CARD FOR BIT
01C9 59         ROLB            ;ROLL CARRY BIT INTO B
01CC 7C 0045    INC     SCNPTR+1        ;UPDATE BIT INDEX LSB
01CF 24 F7 =    BCC     BITRDI  ;IF KLUDGEY FLAG BIT CARRIED OUT
                ; WE HAVE A DIGIT
                ; STORE IT IN RAM
                ;
01D1 DE 46Z     LDX     DIGPTR
01D3 E7 00      STAB    0,X
01D5 08         INX             ;UPDATE STROAGE POINTER
01D6 DF 46Z     STX     DIGPTR  ;SAFEKEEPING IN RAM
01D8 20 E6 =    BRA     CRLRDL  ;GO GET ANOTHER DIGIT
                ;
```

```
                ;
                ;
                ;
                ; CRDSCN:  CHECKS MAGNET BIT
                ;
                ; CALL WITH INDEX INTO COIL ADDR TABLE IN SCNPTR
                ; SETS CARRY BIT ACCORDING TO RESULT
                ;
01DA 86 F0      CRDSCN:    LDAA  #$F0              ;CLEAR COILS
01DC 97 A4         STAA  BUFA
01DE 01            NOP              ;WAIT FOR COILS TO SETTLE
01DF 01            NOP
01E0 01            NOP
01E1 96 A4         LDAA  BUFA               ;CLR PIA EDGE DETECTOR
01E3 DE 442        LDX     SCNPTR  ;PTR FOR THIS BIT
                ;
01E5 07            TPA              ;DISABLE INTERRUPTS DUE
01E6 36            PSHA             ;TO CRITICAL TIMING
01E7               PIOFF
                ;
01E8 A6 00         LDAA  0,X                ;GET COIL ADDRESS FROM EPROM
01EA 97 A4         STAA  BUFA               ;AND TURN ON COIL
01EC 01            NOP
01ED 01            NOP
01EE 01            NOP
01EF 01            NOP
01F0 01            NOP              ;WAIT FOR COIL RESPONSE
01F1 01            NOP
01F2 01            NOP              ;SET CARRY BIT ACCORDING TO
01F3 96 A5         LDAA  CSRA               ;RESPONSE ON CRA7
```

```
01F7 32          PULA              ;RESTORE INTERRUPT STATUS
01F8 06          TAP
01F9 86 F0       LDAA    #$F0      ;TURN OFF COIL
01FB 97 A4       STAA    BUFA
01FD 0D          SEC               ;NORTH SPOT--SET CARRY
01FE 39          RTS
               ;
01FF 32       CRDSC:     PULA              ;RESTORE INTERUPT STATUS
0200 06          TAP
0201 86 F0       LDAA    #$F0
0203 97 A4       STAA    BUFA
0205 0C          CLC               ;SOUTH SPOT--CLR CARRY
               ;
0206 39          RTS
```

```
                ;
                ;  FIND
                ;
                ;  THE FIND ROUTINE SEARCHES THE TABLE OF IDS FOR THE ID
                ;  STORED IN DISDIG. IF THE ID IS FOUND IN THE TABLE THEN
                ;  THE TIME ZONE FOR THAT ID IS RETURNED IN
                ;  EDTZON. ALSO, THE VARIABLE  EDTPTR IS SET TO
                ;  POINT TO THE FIRST BYTE OF THE MATCHING ENTRY.
                ;  IF THE ID IS NOT FOUND THEN EDTZON IS SET TO
                ;  ZERO AND EDTPTR POINTS TO THE FIRST ENTRY LARGER
                ;  THAN THE ID. IF THE ID IS GREATER THAN ALL THE ENTRIES
                ;  IN THE TABLE THEN EDTPTR HAS THE VALUE ENDPTR.
                ;
0207 CE 0004 FIND:      LDX     #CMOS-3 ;ADDRESS OF TABLE - 3
                ;
020A BD 03LE DOENT:     JSR     INX3            ;NEXT ELEMENT OF TABLE
0201 DF 37Z     STX     EDTPTR          ;MAYBE THIS IS THE ENTRY WE
                         SEEK
020F BC 0005    CPX     ENDPTR          ;END OF TABLE
0212 27 0D =    BEQ     NOTFOU          ;WELL COMPARAND NOT FOUND IN
                        TABLE
```

```
                ;
0214 BD 0225      JSR     COMDIG   ;COMPARE DISDIG AND TABLE ENTRY
0217 25 F1 =      BCS     DOENT    ;IF LOW THEN TRY NEXT ENTRY
0219 22 06 =      BHI     NOTFOU   ;WE HAVE GONE TOO FAR
                ;
021B A6 02        LDAA    2,X              ;GET THIRD BYTE OF ENTRY
021D 84 0F        ANDA    #$0F             ;SAVE ONLY TIME ZONE
021F 20 01 =      BRA     RET
                ;
0221 4F         NOTFOU:   CLRA             ;ZERO TIME ZONE
                ;
0222 97 392     RET:      STAA    RETZON   ;SAVE TIME ZONE
0224 39           RTS
```

```
                ;
                ;  COMDIG
                ;
                ;  COMDIG COMPARES THE ENTRY POINTED TO BY X
                ;  WITH THE ID STORED IN DISDIG. RETURNS CARRY SET
                ;  IF THE ENTRY IS SMALLER, ZERO SET IF THEY ARE
                ;  THE SAME.
                ;
0225 A6 00   COMDIG:   LDAA   0,X            ;GET FIRST BYTE OF
                 TABLE ENTRY
0227 91 342     CMPA   DISDIG  ;COMPARE TABLE BYTE AND ID BYTE
0229 26 0F =    BNE    RETCOM  ;RETURN IF NOT EQUAL
                ;
022B A6 01      LDAA   1,X     ;SECOND BYTE OF TABLE ENTRY
022D 91 352     CMPA   DISDIG+1        ;COMPARE SECOND BYTES
022F 26 09 =    BNE    RETCOM
                ;
0231 A6 02      LDAA   2,X     ;THIRD BYTE
0233 84 F0      ANDA   #$F0    ;ZAP TIME ZONE FIELD
0235 D6 362     LDAB   DISDIG+2  ;GET THIRD BYTE OF DISDIG

0237 C4 F0      ANDB   #$F0    ;ZAP ITS TIME ZONE, TOO
0239 11         CBA
                ;

023A 39      RETCOM:   RTS
```

```
                ;
                ;  SETFOX
                ;
                ;  SETFOX SETS THE MASTER CARD. THE KEY IN DIGTAB
                ;  IS STORED INTO THE LOCATION FOX.
                ;
023B BD 02B5 SETFOX:    JSR     PAKARD  ;PACK DIGTAB INTO DISDIG
023E 96 34Z     LDAA    DISDIG  ;GET FIRST BYTE OF DISDIG
0240 B7 0002    STAA    FOX     ;PUT INTO FIRST BYTE OF FOX
0243 96 35Z     LDAA    DISDIG+1        ;SECOND DIGIT
0245 B7 0003    STAA    FOX+1
0248 96 36Z     LDAA    DISDIG+2
024A 8A 0F      ORAA    #$2F    ;PUT IN 'F' TIME ZONE
024C B7 0004    STAA    FOX+2
024F 39         RTS
                ;
                ;
                ;  CHKFOX
                ;
                ;  CHKFOX CHECKS FOR THE MASTER CARD TO ALLOW
                ;  EDITING OF THE TABLE OF IDS. RETURNS THE
                ;  ZERO FLAG TRUE IF THE ID IN DIGTAB IS THE MASTER

                ;  CARD, OTHERWIZE ZERO IS SET TO FALSE.
                ;
0250 BD 02B5 CHKFOX:    JSR     PAKARD  ;PACK DIGITS INTO DISDIG
0253 CE 0002    LDX     #FOX
0256 BD 0225    JSR     COMDIG  ;CHECK IF DIGITS ARE THE SAME
0259 26 07 =    BNE     CHKRET  ;IF NOT RETURN
025B B6 0004    LDAA    FOX+2   ;GET THIRD DIGIT OF MASTER
025E 84 0F      ANDA    #$0F    ;LEAVE ONLY TIME ZONE
2260 81 0F      CMPA    #$0F    ;IS TIME ZONE 'F'
```

```
0262 39        CHFRET:    RTS
               ;
               ;  SEARCH
               ;
               ;  SEARCH SEARCHES FOR THE ID IN
               ;  KEYTAB. IF THE ENTRY EXISTS THEN THE TIME ZONE
               ;  IS PUT IN THE DISPLAY, OTHERWISE ZERO IS PUT IN THE
               ;  TIME ZONE DISPLAY. EDTPTR POINTS TO THE ENTRY IF IT
               ;  IS FOUND OTHERWISE IT POINTS TO THE FIRST LARGER ENTRY
               ;  OR ENDPTR IF THERE IS NO LARGER ENTRY.
               ;
0263 7F 0019 SEARCH:    CLR     KEYZON  ;PREPARE FOR PACKING
0266 BD 0271    JSR     PKDIG   ;PACK KEYTAB INTO DISDIG
0269 BD 0207    JSR     FIND    ;FIND THE ENTRY
026C 96 39Z     LDAA    EDTZON  ;GET THE TIME ZONE(ZERO IF INVALID)
026E 97 19Z     STAA    KEYZON  ;DISPLAY TIME ZONE
0270 39         RTS
```

```
                ;
                ;  PKDIG
                ;
                ;  PKDIG PACKS THE DIGITS IN
                ;  KEYTAB INTO DISDIG TWO DIGITS TO A BYTE.
                ;
0271 96 14Z  PKDIG:     LDAA    KEYTAB  ;GET FIRST BYTE OF KEYTAB
0273 BD 03E6    JSR     ASLA4   ;SHIFT DIGIT INTO LEFT HALF OF BYTE
0276 9A 15Z     ORAA    KEYTAB+1  ;OR SECOND DIGIT INTO RIGHT HALF
0278 97 34Z     STAA    DISDIG  ;STORE IT AS FIRST BYTE OF DISDIG
027A 96 16Z     LDAA    KEYTAB+2  ;THIRD DIGIT
027C BD 03E6    JSR     ASLA4
027F 9A 17Z     ORAA    KEYTAB+3  ;FOURTH DIGIT

0281 97 35Z     STAA    DISDIG+1  ;SECOND BYTE OF DISDIG
0283 96 18Z     LDAA    KEYTAB+4  ;FIFTH DIGIT
0285 BD 03E6    JSR     ASLA4

0288 9A 19Z     ORAA    KEYZON  ;TIME ZONE
028A 97 36Z     STAA    DISDIG+2
028C 39         RTS
```

```
                ;
                ;  UPKDIG
                ;
                ;  UPKDIG UNPACKS THE DIGITS IN DISDIG INTO KEYTAB
                ;  FOR DISPLAY.
                ;
028D 96 34Z  UPKDIG:   LDAA    DISDIG   ;GET BYTE ONE OF DISDIG
028F BD 03EB    JSR    LSRA4    ;GET LEFT DIGIT INTO RIGHT HALF
0292 97 14Z     STAA   KEYTAB   ;FIRST BYTE OF KEYTAB
0294 96 34Z     LDAA   DISDIG   ;GET BYTE ONE AGAIN
0296 84 0F      ANDA   #$0F     ;MASK LEFT DIGIT
0298 97 15Z     STAA   KEYTAB+1 ;SECOND BYTE OF KEYTAB
029A 96 35Z     LDAA   DISDIG+1 ;BYTE TWO OF DISDIG
029C BD 03EB    JSR    LSRA4
029F 97 16Z     STAA   KEYTAB+2
02A1 96 35Z     LDAA   DISDIG+1
02A3 84 0F      ANDA   #$0F
02A5 97 17Z     STAA   KEYTAB+3
02A7 96 36Z     LDAA   DISDIG+2
02A9 BD 03EB    JSR    LSRA4
02AC 97 18Z     STAA   KEYTAB+4
02AE 96 36Z     LDAA   DISDIG+2
02B0 84 0F      ANDA   #$0F
02B2 97 19Z     STAA   KEYZON   ;TIME ZONE
02B4 39         RTS
```

```
                ;
                ;  PAKARD
                ;
                ;  PAKARD PACKS THE DIGITS IN DIGTAB INTO DISDIG
                ;
02B5 96 2A7  PAKARD:    LDAA    DIGTAB
02B7 BD 03E6    JSR     ASLA4

02BA 9A 2B7     ORAA    DIGTAB+1
02BC 97 347     STAA    DISDIG
02BE 96 2C7     LDAA    DIGTAB+2
02C0 BD 03E6    JSR     ASLA4
02C3 9A 2D7     ORAA    DIGTAB+3
02C5 97 357     STAA    DISDIG+1
02C7 96 2E7     LDAA    DIGTAB+4
02C9 BD 03E6    JSR     ASLA4

02CC 97 367     STAA    DISDIG+2
02CE 39         RTS
```

```
                ;
                ;  DELETE
                ;
                ;  DELETE REMOVES THE ENTRY POINTED TO BY EDTPTR FROM THE
                ;  TABLE OF VALID ITS. ZAP TIME ZONE IN DISPLAY
                ;  ASSUME: #CMOS <= EDTPTR < ENDPTR
                ;
02CF 7D 0039 DELETE:    TST     EDTZON  ;IS THIS ENTRY VALID
02D2 27 24 =    BEQ     NOENT
02D4 FE 37Z     LDX     EDTPTR  ;GET 'THIS' ENTRY
                ;
02D6 BC 0005 DELTOP:    CPX     ENDPTR  ;ARE WE PAST LAST ENTRY
02D9 27 11 =    BEQ     OUT             ;DONE
02DB A6 03      LDAA    3,X             ;MOVE NEXT ENTRY ONTO THIS
                        ENTRY
02DD A7 00      STAA    0,X
02DF A6 04      LDAA    4,X
02E1 A7 01      STAA    1,X
02E3 A6 05      LDAA    5,X
02E5 A7 02      STAA    2,X
02E7 BD 03DE    JSR     INX3            ;ADD 3 TO X
02EA 20 EA =    BRA     DELTOP          ;MOVE NEXT ENTRY
                ;
02EC BD 03E2 OUT:       JSR     DEX3            ;DECREMENT X BY 3
02EF FF 0005    STX     ENDPTR  ;ENDPTR = ENDPTR - 3
02F2 7F 0039    CLR     EDTZON  ;CURRENT ENTRY IS NOT VALID
02F5 7F 0019    CLR     KEYZON  ;ZAP TIME ZONE IN DISPLAY
02F8 39         NOENT:  RTS
```

```
                ;
                ;  INSERT
                ;
                ;  INSERT INSERTS THE ID AND TIME ZONE IN KEYTAB
                ;  INTO THE TABLE.
                ;
                INSERT.:
02FB CE 0005    IDX     #5      ;5 ITERATIONS
                ;
02FC A6 13Z     INSNXT:  LDAA   KEYTAB-1,X      ;GET DIGIT OF KEYTAB
02FE 81 09      CMPA    #$09            ;CHK FOR GREATER THAN 9
0300 22 62 =    BHI     INSFAI  ;ILLEGAL DIGIT GO AWAY
0302 09         DEX
0303 26 F7 =    BNE     INSNXT
                ;
0305 96 19Z     LDAA    KEYZON  ;GET TIME ZONE
0307 81 08      CMPA    #$08            ;ILLEGAL?
0309 22 59 =    BHI     INSFAI  ;GO AWAY
030B 7D 0019    TST     KEYZON  ;ILLEGAL TIME ZONE
030E 27 54 =    BEQ     INSFAI  ;IF SO GO AWAY
                ;
0310 BD 0271    JSR     PKDIG   ;PACK KEYTAB INTO DISDIG
0313 BD 0207    JSR     FIND    ;SEE IF ENTRY IN TABLE
0316 7D 0039    TST     EDTZON ;CHECK ZONE
0319 26 25 =    BNE     HAVSPA ;ITS ALREADY THERE
031B FE 0005    LDX     ENDPTR  ;GET POINTER TO PAST LAST ENTRY
031E 9C 32Z     CPX     ENDMEM  ;ARE WE PAST END OF MEMORY
0320 27 38 =    BEQ     OVERFI
```

```
                ;
0322 9C 372  INSTOP:    CPX     EDTPTR  ;ARE WE UP TO CURRENT ENTRY
0324 27 11 =    BEQ     OUT1
0326 BD 03E2    JSR     DEX3    ;DECREMENT X BY 3
0329 A6 00      LDAA    0,X     ;MOVE THIS ENTRY DOWN BY ONE
032B A7 03      STAA    3,X
032D A6 01      LDAA    1,X
032F A7 04      STAA    4,X
0331 A6 02      LDAA    2,X
0333 A7 05      STAA    5,X
0335 20 EB =    BRA     INSTOP  ;MOVE NEXT ENTRY
                ;
0337 FE 0005 OUT1:      LDX     ENDPTR  ;INCREMENT ENDPTR BY 3

033A BD 03DE    JSR     INX3
033D FF 0005    STX     ENDPTR
0340 BD 03BA HAVSPA:    JSR     EDTIN   ;READ KEYTAB INTO TABLE
0343 96 192     LDAA    KEYZON  ;GET TIME ZONE FROM DISPLAY
0345 97 392     STAA    EDTZON  ;PUT IT IN EDTZON
                ; HERE TO FLASH THE DISPLAY OFF
0351 09         DEX
0352 26 F9 =    BNE     FLASH
0354 7C 021E    INC     POISON
```

```
0357 7E 03CC     JMP     EDTOUT  ;RESTORE DISPLAY AND RETURN
                 ;
035A BD 0006 OVERFL:     JSR     BLANK   ;BLANK DISPLAY
035D 7F 0019     CLR     KEYZON  ;ZERO THE DISPLAY TIME ZONE
0360 7C 001E     INC     POISON
0363 39          RTS
                 ;
0364 7F 0039 INSFAI:     CLR     EDTZON  ;ILLEGAL ENTRY
0367 7F 0019     CLR     KEYZON  ;ZAP TIME ZONE IN DISPLAY
036A 39          RTS
                 ;

                 ;  UP
                 ;
                 ;  UP MOVES EDTPTR UP TO THE PREVIOUS ENTRY.
                 ;  IF THE POINTER IS ALREADY AT THE FIRST ENTRY
                 ;  OF THE TABLE IT IS NOT MOVED.
                 ;
036B DE 37Z  UP:         LDX     EDTPTR  ;GET CURRENT ENTRY
036D 8C 0027     CPX     #CMOS   ;ARE WE AT THE FIRST ENTRY
0370 27 0C =     BEQ     RETUP   ;IF SO THE RETURN
0372 BD 03E2     JSR     DEX3    ;ELSE DECREMENT X BY 3
0375 DF 37Z      STX     EDTPTR  ;EDTPTR = EDTPTR - 6
0377 BD 03CC     JSR     EDTOUT  ;PUT ENTRY INTO DISPLAY
037A 96 19Z      LDAA    KEYZON  ;GET TIME ZONE
037C 97 39Z      STAA    EDTZON  ;LEAVE IN EDTZON
037E 39      RETUP:      RTS
```

```
                ;
                ;
                ;  DOWN
                ;
                ;  DOWN MOVES EDTPTR DOWN BY ONE ENTRY. IF EDTPTR IS
                ;  ALREADY THE LAST ELEMENT OF THE TABLE DO NOTHING.
                ;
0379 DE 37Z  DOWN:      LDX     EDTPTR  ;GET EDIT POINTER
0381 BC 0005    CPX     ENDPTR  ;PAST LAST ENTRY?
0384 27 16 =    BEQ     RETDWN  ;GO AWAY
0386 7D 0039    TST     EDTZON  ;IS CURRENT ENTRY LEGAL
0389 27 03 =    BEQ     ZERZON  ;USE THIS ENTRY
038B BD 03DE    JSR     INX3    ;GO TO NEXT ENTRY

038E BC 0005 ZERZON:    CPX     ENDPTR  ;PAST LAST ENTRY NOW?
0391 27 09 =    BEQ     RETDWN  ;GO AWAY

0393 DF 37Z     STX     EDTPTR  ;SAVE AS EDTPTR
0395 BD 030C    JSR     EDTOUT  ;PUT OUT ENTRY ON DISPLAY
0398 96 19Z     LDAA    KEYZON  ;GET TIME ZONE OF DISPLAY

039A 97 39Z     STAA    EDTZON  ;PUT IT IN EDIT ZONE
039C 39      RETDWN:    RTS
```

```
                ;
                ;  CLRALL
                ;
                ;  CLRALL CLEARS THE ENTIRE TABLE OF VALID IDS
                ;
039D 9E 14Z  CLRALL:    LDAA    KEYTAB   ;GET FIRST BYTE OF DISPLAY
039F 9A 15Z     ORAA    KEYTAB+1         ;OR IN SECOND BYTE
03A1 9A 16Z     ORAA    KEYTAB+2
03A3 9A 17Z     ORAA    KEYTAB+3
03A5 9A 18Z     ORAA    KEYTAB+4
03A7 9A 19Z     ORAA    KEYZON
03A9 26 0E =    BNE     CLRRET   ;IF DISPLAY NOT ALL ZERO GO AWAY
03AB BD 000C    JSR     BLANK    ;BLANK DISPLAY
                ;
03AE CE 0007 DOCLR:     LDX     #CMCS    ;GET START OF TABLE
03B1 FF 0005    STX     ENDPTR   ;MAKE IT END OF TABLE
03B4 DF 37Z     STX     EDTPTR   ;ALSO CURRENT ENTRY
03B6 7F 0039    CLR     EDTZON   ;THIS ENTRY ILLEGAL
03B9 39      CLRRET:    RTS
```

```
                ;
                ;  EDTIN
                ;
                ;  EDTIN READS THE DISPLAY IN KEYTAB INTO THE ENTRY
                ;  POINTED TO BY EDTPTR.
                ;
03BA BD 0271 EDTIN:     JSR     PKDIG   ;PACK THE DIGITS INTO DISDIG
03BD DE 37Z     LDX     EDTPTR  ;GET POINTER TO ENTRY
03BF 96 34Z     LDAA    DISDIG  ;GRAB FIRST BYTE OF DISDIG
03C1 A7 00      STAA    0,X     ;PUT IT INTO TABLE
03C3 96 35Z     LDAA    DISDIG+1
03C5 A7 01      STAA    1,X
03C7 96 36Z     LDAA    DISDIG+2
03C9 A7 02      STAA    2,X
03CB 39         RTS
                ;
                ;
                ;  EDTOUT
                ;
                ;  EDTOUT PUTS THE ENTRY POINTED TO BY EDTPTR
                ;  OUT ONTO THE DISPLAY.
                ;
03CC DE 37Z  EDTOUT:    LDX     EDTPTR  ;GET POINTER TO ENTRY
03CE A6 00      LDAA    0,X     ;GET FIRST BYTE OF ENTRY
03D0 97 34Z     STAA    DISDIG  ;PUT IT INTO FIRST BYTE OF DISDIG
03D2 A6 01      LDAA    1,X
03D4 97 35Z     STAA    DISDIG+1
03D6 A6 02      LDAA    2,X
03D8 97 36Z     STAA    DISDIG+2
03DA BD 028D    JSR     UPKDIG  ;UNPACK DISDIG INTO THE DISPLAY
03DD 39         RTS
```

```
                ;
                ;  USEFUL ROUTINES
                ;
03DB 08         INX3:       INX
03DF 08         INX2:       INX
03E0 08            INX
03E1 39            RTS
                ;
03E2 09         DEX3:       DEX
03E3 09         DEX2:       DEX

03E4 09            DEX
03E5 39            RTS
                ;
03E6 48         ASLA4:      ASLA
03E7 48         ASLA3:      ASLA
03E8 48         ASLA2:      ASLA
03E9 48            ASLA
03EA 39            RTS
                ;
03EB 44         LSRA4:      LSRA
03EC 44         LSRA3:      LSRA
03ED 44         LSRA2:      LSRA
03EE 44            LSRA
03EF 39            RTS
```

```
                ;
                ;  DOSUM
                ;
                ;  DOSUM RITURNS THE CHECK SUM OF CMOS MEMORY FROM
                ;  LOCATION #SUM+2 TO LOCATION ENDMEM IN ACCS A AND B
                ;***************
03F0 CE 0002 DOSUM:     LDX     #SUM+2  ;FIRST ADDRESS FOR CHECK SUM

03F3 4F         CLRA
03F4 5F         CLRB
03F5 EB 00   LOOP1:     ADDB    0,X     ;ADD BYTE TO B
03F7 99 00      ADCA    0       ;ADD CARRY OUT TO A
03F9 08         INX             ;GO TO NEXT BYTE
03FA 9C 32Z     CPX     ENDMEM ;PAST END OF MEMORY?
03FC 26 F7 =    BNE     LOOP1
                ;
03FE 43         COMA            ;COMPLEMENT RESULT
03FF 53         COMB
0400 39         RTS
```

```
                ;
                ;  CHKSUM
                ;
                ;  CHKSUM COMPARES THE CHECK SUM OF MEMORY TO THE
                ;  VAULES STORED IN LOCATIONS SUM AND SUM + 1. IF
                ;  THE SUM IS DIFFERENT CARRY IS SET TO 1 ELSE
                ;  CARRY IS ZERO.
                ;
0401 BD 03F0 CHKSUM:    JSR     DOSUM   ;GET CHKSUM OF CMOS MEMORY
0404 B1 0000    CMPA    SUM     ;CHECK FIRST BYTE
0407 26 07 =    BNE     CHKERR  ;TOO BAD
0409 F1 0001    CMPB    SUM+1   ;SECOND BYTE
040C 26 02 =    BNE     CHKERR
040E 0C         CLC             ;CARRY = 0 MEANS OK
040F 39         RTS
                ;
0410 0D         CHKERR:     SEC             ;CARRY = 1 MEANS FAIL
0411 39         RTS
                ;
                ;  SETSUM
                ;
                ;  SETSUM PUTS THE CHECK SUM OF MEMORY INTO
                ;  LOCATIONS SUM AND SUM + 1
                ;
0412 BD 03F0 SETSUM:    JSR     DOSUM   ;GET CHECK SUM OF MEMORY
0415 B7 0000    STAA    SUM     ;STORE FIRST BYTE
0418 F7 0001    STAB    SUM+1   ;SECOND TOO
041B 39         RTS
```

```
                ;
                ; ROUTINE TO SEE IF SYS CODE IN DIGTAB IS OK
                ; RETURNS Z=1 IF OK
        041CP CHKSYS     =        *
041C 96 C5        LDAA     S.SYS
041E 84 0F        ANDA     #$0F
0420 91 30Z       CMPA     DIGTAB+6
0422 26 08 =      BNE      SYSRET  ;BAD NEWS
                ; NOW FOR HIGHER DIGIT
0424 96 C5        LDAA     S.SYS

0426 44           LSRA
0427 44           LSRA
0428 44           LSRA
0429 44           LSRA
042A 91 2FZ       CMPA     DIGTAB+5
042C 39         SYSRET:    RTS
                ; RTL CHECKS TO SEE IF THIS CARD IS THE SAME
                ; AS THE LAST ONE.  IF IT IS NOT (AND IT HAS A VALID
                ; SYSTEM CODE) THEN WE STORE THIS AS THE NEW
                ; COMPARAND AND CLEAR THE COUNT OF ERROR TRIES
                ;*
        042DP RTI        =        *
042D BD 041C      JSR      CHKSYS
0430 26 0C =      BNE      RTS     ;BAD SYS CODE
                ;
0432 CE 0005      IDX      #$0005  ;FIVE DIGS IN RTLBUF
0435 A6 29Z     RTLI:      LDAA     DIGTAB-1,X
0437 A1 39Z       CMPA     RTLBUF-1,X
0439 26 04 =      BNE      NEWRT
043B 09           DEX
```

```
043C 26 F7 =     BNE     FRTLL
               ; IT WAS THE SAME
043E 39        FRTS:     RTS
               ;

043F A6 29Z    NEWFRT:   LDAA    DIGTAB-1,X
0441 A7 39Z      STAA    RTIBUF-1,X
0443 09          DEX
0444 26 F9 =     BNE     NEWFRT
               ;
0446 7F 003F     CLR     NTRIES
0449 39          RTS
               ;
               ; ROUTINE TO CHECK DURESS FLAG
               ; TRIGGERS RELAY IF SET
       044AP DURESS      =       *
044A 96 81       LDAA    FPROM+1
044C 84 20       ANDA    #C.DUR
044E 27 0E =     BEQ     NODUR   ;HE DIDN'T BUY THE DURESS OPTION
               ;
0450 96 1CZ      LDAA    DURESF
0452 27 0A =     BEQ     NODUR   ;HE DIDN'T COMPLAIN
               ;
0454 86 40       LDAA    #R.DUR
0459 CE FC7C     LDX     #T.03S
045C DF 0CZ      STX     DUCNTF
045E 39        NODUR:    RTS
               ;
```

```
                ;
                ;
                ;  ROUTINE TO CHECK IDEN PASSWORD
                ;  RETURNS WITH CARRY = 1 IF OK
                ;  CARRY = 0 IF BAD
                ;
                ;  CALLS MIX TO RECALCULATE COMBINATION FUNCTION
                ;  ASSUMES CARD IMAGE IN DIGTAB
                ;  AND PASSWORD IN KEYTAB
                ;
                ;  MIXPTR IS A CALCULATED INDEX INTO DIGTAB
                ;  COMBX IS AN INDEX INTO MASTER
                ;  WE PROCESS THE DIGITS OF THE PASSWORD IN ORDER
                ;
        045FP COMBIN     =       *
045F BD 0482    JSR      MIX     ;TABLE OF DIGIT INDICES IN 'MASTER'
0462 7F 004A    CLR      MIXPTR  ;MSB OF XREG
0465 CE 0002    LDX      #0      ;FIRST DIGIT OF PASSWORD
0468 A6 217  COMBI:      LDAA    MASTER,X
046A DF 4BZ     STX      COMBX
046C 97 4BZ     STAA     MIXPTR+1
046E DE 4AZ     LDX      MIXPTR
```

```
                ; NOW X INDICATES WHICH DIGIT OF HIS
                ; CARD FORMS THIS DIGIT OF THE PASSWORD
0470 A6 2A Z      LDAA    DIGTAB,X
0472 DE 48Z       LDX     COMBX
0474 A1 14Z       CMPA    KEYTAB,X
0476 26 08 =      BNE     COMBAD
0478 08           INX
0479 8C 0003      CPX     #3
047C 26 EA =      BNE     COMBL
047E 0D           SEC
047F 39           RTS
                ;
0480 0C         COMBAD:   CLC
0481 39           RTS
                ;
```

```
;
; SUBROUTINE TO PREPARE COMPARAND
; TABLE FOR IDEK PERSONAL CODE
;

; THE IDEK CODE IS 4 DIGITS TAKEN FROM THE CARDHOLDER'S
; 5 DIGIT CODE IN AN ARBITRARY ORDER
;
; SO WE HAVE ALL COMBINATIONS OF FIVE THINGS
; TAKEN FOUR AT A TIME
; >>>120<<<
; SPECIFY WHICH OF THE FIVE IS MISSING (3 BITS)
; >>>24<<<
; SPECIFY WHICH OF THE FOUR APPEARS FIRST (2 BITS)

; >>>6<<<
; SPECIFY WHICH COMES NEXT (2 BITS)

; >>>2<<<
; TAKE THE REMAINING TWO IN ORDER, OR REVERSED (1 BIT)
;

; BIT MEANINGS:
;  TTHE PERM/COMB SWITCH HAS FOUR FIELDS,
; IN THIS FORM:    (MMMFFSSX)
; WHERE MMM INDICATES WHICH IS MISSING
;  FF...WHICH COMES FIRST
;  SS...WHICH COMES SECOND
;  X...=1 IF LAST SHOULD BE FLIPPED
;
```

```
;*****************************************************************
;
;  RTC
;
;*****************************************************************
;
;  ALL TASKS WHICH REQUIRE TIME DELAYS AND ALL
;  PARAMETERS REQUIRING CONTINUOUS MONITORING
;  ARE HANDLED BY THIS SET OF ROUTINES.
;  SPECIFICALLY, THIS MODULE HANDLES THE
;  FOLLOWING TASKS:
;
;  DOOR OPEN PUSHBUTTON MONITORING
;  RELAY ACTIVATION SEQUENCES
;  RELAY CLOSURES AFTER TIME DELAY
;  DEAD MAN SET
;  CARD EDGE DETECT
;
```

```
                TITLE   'RTC'
            ;
            ;   DEFINE MODULE STARTING ADDRESS
            ;
0000            PSECT
            ;
0000 7E 000C    JMP     RTC
0003 7E 00F4    JMP     OPEN
0006 7E 01F5    JMP     BLANK
0009 7E 015B    JMP     RDYON
            ;
```

```
                ;
                ;
                ;  RTC
                ;
                ;
                ;  THIS IS THE MAIN SERVICE ROUTINE FOR THE REAL
                ;  TIME CLOCK INTERRUPTS.  A RISING EDGE OF THE CLOCK
                ;  FORCES AN IRQ INTERRUPT WHICH VECTORS TO RTC.
                ;  RTC IN TURN CALLS SUBROUTINES TO EXECUTE THE
                ;  VARIOUS TASKS THAT NEED SERVICING ONE AT A TIME.
                ;
                ;
        020CF RTC       =       *

000C 96 4F2     LDAA    VAREND
000E 26 FE =    BNE     *                       ;STACK OVERFLOW????
                ;
0010 96 A6      LDAA    PUPB    ;CLR INTERRUPT AT PIA
0012 86 38      LDAA    #$38    ;RESET PIA DDR'S
0014 97 A5      STAA    CSRA
0016 86 0A      LDAA    #$0A
0018 97 A7      STAA    CSRB
001A 86 FF      LDAA    #$FF
001C 97 A4      STAA    PUPA
001E 86 FE      LDAA    #$FE
0020 97 A6      STAA    PUPB
0022 86 3C      LDAA    #$3C    ;SET DEAD MAN HIGH
0024 97 A5      STAA    CSRA
0026 86 0E      LDAA    #$0E
0028 97 A7      STAA    CSRB
```

```
                ;
002A BD 0174    JSR     KEYSEB  ;SCAN KEYBD
002I BD 003A    JSR     CRDELG  ;CHK FOR CRD IN
0030 BD 0069    JSR     MUX     ;TEND THE DISPLAY IF NEEDED
0033 BD 0090    JSR     APP     ;CHK DOOR OPEN PUSHBUTTON
0036 BD 00B1    JSR     CNTDN   ;COUNT DOWN SERVICE TIMERS
                ;
0039 3B         RTI             ;RETURN TO BACKGROUND TASK
                ;
```

```
                ;
                ;
                ;  CRDEDG
                ;
                ;
                ;  CHECKS FOR CARD, SETS CRDFLG ACCORDINGLY
                ;
                ;  00       NO CARD
                ;  NN       (1<NN<=20) CARD IN, BUT BOUNCING
                ;  01       CARD IN, NOT YET PROCESSED
                ;  FE       CARD IN, ALREADY PROCESSED
                ;
        003AP CRDEDG     =        *
003A 96 127     LDAA     EDMODE  ;ARE WE EDITING?
003C 26 2A =    BNE      CRDDN   ;YES; IGNORE CARDS
003E 96 11Z     LDAA     CRDFLG
0040 26 11 =    BNE WASIN
                ; HERE IF THE CARD WAS NOT IN LAST TIME
0042 96 A6      LDAA     BUFF
0044 84 01      ANDA     #$01
0046 27 2A =    BEQ      CRDDN
0048 86 20      LDAA     #$20
004A 97 11Z     STAA     CRDFLG  ;PUT DEBOUNCE CNT INTO CRDFLG
                ;
004C 7F 0013    CLR      KEYCNT  ;IDFK ENTRY START OVER
004F 7F 001C    CLR      DURESF  ;DURESS MUST BE AFTER CARD IN
0052 39         RTS
```

```
                ;
                ;  EDITOR DISPLAY MULTIPLEXER
                ;  CALL HERE ONCE A TICK TO CHANGE THE DISPLAY
                ;  THIS ROUTINE IS HIGHLY NON-REENTRANT
                ;  INDEED, IT OUTPUTS A DIFFERENT DIGIT EACH
                ;  TIME IT IS CALLED.
                ;
        0069F MUX        =        *
0069 96 122     LDAA     EDMODE  ;SHOULD THE DISPLAY BE LIT?
006B 27 FB =    BEQ      CRTDN   ;;NO
006D 96 4DZ     LDAA     MUXPTR+1
006F 48         ASLA
0072 97 4EZ     STAA     MUXTMP

0072 D6 A6      LDAB     BUFB
0074 C4 F1      ANDB     #$F1
0076 DA 4EZ     ORAB     MUXTMP
                ; B CONTAINS DIGIT#
                ; NOW GET DATA FOR THIS DIGIT
0078 96 A4      LDAA     BUFA
007A 84 F0      ANDA     #$F0
007C DE 4CZ     LDX      MUXPTR
007E AA 14Z     ORAA     KEYTAB,X
0080 97 A4      STAA     BUFA
0082 D7 A6      STAB     BUFB
                ;
0084 09         DEX
0085 8C 0000    CPX      #0      ;DEX DOESN'T SET FLAGS NICELY!
0088 2A 03 =    BPL      *+5
008A CE 0005    LDX      #$0005
008D DF 4CZ     STX      MUXPTR
008F 39         RTS
```

```
                ;
                ;
                ;  APB
                ;
                ;
                ;  CHECKS DOOR OPEN PUSHBUTTON.    CAUSES DOOR OPEN
                ;  SEQUENCE WHEN CLOSURE IS DETECTED IF PUSHER'S
                ;  FINGER HAS RIGHT SYSTEM CODE
                ;
0092 96 80      APB:        LDAA    FPROM   ;CHK FOR AS OPTION
0092 84 20          ANDA    #C.AS
0094 27 1A =        BEQ     APBD
                ;
0096 96 102         LDAA    APBFLG  ;IGNORE SWITCH IF
0098 26 0D =        BNE     APX     ;ALREADY SERVICED
                ;
009A 96 C3          LDAA    S.XXX   ;OPEN DOOR IF SWITCH
009C 84 80          ANDA    #X.AS   ;IS PUSHED
009E 26 10 =        BNE     APBD
00A0 BD 00F4        JSR     OPEN
00A3 7C 0010        INC     APBFLG  ;FLAG AS SERVICED
00A6 39             RTS
                ;
00A7 96 C3      APX:        LDAA    S.XXX   ;CLR FLAG WHEN SWITCH
00A9 84 80          ANDA    #X.AS   ;IS RELEASED
00AB 27 03 =        BEQ     APBD
00AD 7F 0010        CLR     APBFLG
                ;
00B0 39         APBD:       RTS
                ;
```

```
                ;
                ;
                ;  CNTDN
                ;
                ;  EVERY TASK INVOLVING A TIME DELAY HAS A
                ;  COUNTER ASSOCIATED WITH IT. THESE TWO BYTE
                ;  COUNTERS ARE LOADED WITH A NUMBER TO ACTIVATE
                ;  THEM. EACH COUNTER THEN INCREMENTS ON EACH
                ;  CLOCK TICK UNTIL IT OVERFLOWS, AT WHICH TIME
                ;  A COMPLETION ROUTINE IS CALLED TO TAKE THE
                ;  APPROPRIATE ACTION.
                ;
                ; YOU SHOULD ALSO BE AWARE THAT EACH
                ; COMPLETION ROUTINE IS CALLED WITH A VALUE IN AC A
                ; EQUAL TO 2^N WHERE N IS THE VECTOR SLOT NUMBER
                ; OF THAT ROUTINE.

                ; THIS MAKES FOR SIMPLIFIED RLYOFF CALLS
                ;
00B1 CE 0000 CNTDN:     LDX     #$0000  ;SET LOOP INDICES
00B4 86 01      LDAA    #$01
                ;
00B6 6D 002  CNTDNI: TST        CNTRS,X ;CLOCK EACH COUNTER
00B8 27 1D =    BEQ     CNTDNS  ;UNLESS ITS ALREADY
00BA 6C 012     INC     CNTRS+1,X       ;ZERO
00BC 26 19 =    BNE     CNTDNS
00BE 6C 002     INC     CNTRS,X
00C0 26 15 =    BNE     CNTDNS
```

```
                ;
00C2 36            PSHA
00C3 DF 40Z        STX     XREG0    ;IF COUNTER OVERFLOWS
00C5 86 7F         LDAA    #MSB SERV        ;TO ZERO, CALL ASSOCIATED
00C7 97 40Z        STAA    XREG0    ;SERVICE ROUTINE
00C9 DE 40Z        LDX     XREG0
00CB EE 7F         LDX     ISR SERV,X
00CD 32            PULA
00CE 36            PSHA
00CF AD 00         JSR     0,X
00D1 4F            CLRA
00D2 97 40Z        STAA    XREG0
00D4 DE 40Z        LDX     XREG0
00D6 32            PULA
                ;
00D7 08         CNTDNS: INX                          ;INCREMENT LOOP INDICES
00D8 08            INX                        ;LOOP UNTIL ALL CNTRS SERVICED
00D9 48            ASLA                ; SHIFT BIT TO NEXT PLACE
00DA 8C 0010       CPX     #NCNTRS
00DD 26 D7 =       BNE     CNTDNL
```

```
                ;
                ;  SERVICE TABLE
                ;
        00E0F SERV        =        *
00E0            WORD    GOON
00E2            WORD    GOOFF
00E4            WORD    GXOFF
00E6            WORD    EDEND
00E8            WORD    RLYOFF  ;ERCFF
00EA            WORD    RLYOFF  ;ASOFF
00EC            WORD    RLYOFF  ;DUOFF
00EE            WORD    RTS3    ;FOR PATCHING
                ;
```

```
                ;
                ; THIS ROUTINE IS CALLED WHEN
                ; THE EDITOR HAS DONE NOTHING FOR A WHOLE MINUTE
                ; SO WE LEAVE EDIT MODE
                ;
        00F0F EDEND      =        *
00F0 7F 2012    CLR      EDMODE
00F3 39         RTS
                ;
                ;  OPEN
                ;
                ;
                ;  STARTS IOOR OPEN SEQUENCE.
                ;  TURNS ON ALARM SHUNT, WAKES UP GOON TO TURN
                ;  ON GO RELAY AFTER 50 MILLISECOND DELAY.
                ;
00F4 96 02      OPEN:    LDAA     EPROM   ;CHECK 'AS' OPTION,LEAVE
00F6 84 22      ANDA     #O.AS   ;RELAY OFF UNLESS IN
00F8 27 25 =    BEQ      OPENS
                ;
00FA 86 20      LDAA     #R.AS   ;TURN ON 'AS' RELAY
00FC BD 015B    JSR      RLYON
                ;
00FF BD 214B OPENS:      JSR      NOTIME  ;TURN OFF CONFLICTING TIMERS
0102 CE FFF0    LDX      #T.50MS ;WAKE UP GOON IN 50 MS
0105 DF 222     STX      OPCNTR
                ;
0107 39         OPEND:   RTS
        0107F RTS3       =        OPEND
                ;
```

```
                ;
                ;  GOON
                ;
                ;  TURN ON GO RELAY
                ;  ENABLE EITHER GOOFF OR GXOFF TO
                ;  TURN IT OFF LATER
                ;
                ;  "COME IN, TAILOR. HERE YOU MAY ROAST YOUR GOOSE.
                ;
                ;
0108 86 84      GOON:     LDAA    #R.GO    ;ACTIVATE RELAY
010A BD 015E      JSR     RLYON
                ;
010D CE 0002      LDX     #GOCNTR ;SET DELAY ACORDING
0110 96 08        LDAA    S.VTD   ;TO VTD SWITCHES IF
0112 84 0F        ANDA    #$0F    ;VTD NOT ZERO
0114 27 04 =      BEQ     GOONX
0116 BD 0180      JSR     CALCT
0119 39           RTS
                ;
011A 86 FF      GOONX:    LDAA    #$FF     ;WHEN VTD IS ZERO.
011C 97 042       STAA    GXCNTR  ;ENABLE ROUTINE TO
011E 97 052       STAA    GXCNTR+1 ;CLOSE GO RELAY AS SOON
                ;                 ;AS CARD IS REMOVED
0120 39         COOND:    RTS
                ;
```

```
                ;
                ;  GOOFF
                ;
                ; "I PRAY YOU, REMEMBER THE PORTER"
                ;
                ; WHEN 'GO' RELAY TIMES OUT, WE MUST KEEP
                ; THE AS RELAY CLOSED AWHILE LONGER
                ; TIME SPECIFIED BY THE AS/DOD SWITCHES
                ;
0121 86 80   GOOFF:     LDAA    #R.GO
0123 BD 0155    JSR     RLYOFF  ;CLOSE 'GO' RELAY
                ;
0126 96 C0      LDAA    S.AS            ;READ AS/DOD SWITCHES
0128 44         LSRA
0129 44         LSRA
012A 44         LSRA
012B 44         LSRA
012C 4C         INCA    ;AS=0 MEANS SHORTEST TIME
012D 48         ASLA
                ;
                ;  AT THIS POINT, AC CONTAINS 000XXXX0
                ;
012E CE 000A    LDX     #ASCNTR ;LOAD 'AS' COUNTER
0131 BD 0160    JSR     CALCT   ;ACCORDING TO SWITCHES
                ;
0134 39         RTS
                ;
```

```
                ;
                ;  GXOFF
                ;
                ;
                ;  CHECKS IF CARD STILL IN SLOT.
                ;  IF NOT, DISABLES GO IMMEDIATELY
                ;  IF SO, WAKES ITSELF UP ON NEXT CLOCK.
                ;
                ;  "I'LL DEVIL BORROW IT NO LONGER"
                ;

                ;
        0135P GXOFF      =        *
0135 96 A6      LDAA     BUFB     ;CHECK FOR CARD
0137 84 01      ANDA     #01
0139 26 09 =    BNE      STILL
                ; KEEP IT ON IF A.S. BUTTON IS PUSHED
013B 96 C3      LDAA     S.XXX
013D 84 82      ANDA     #X.AS
013F 27 23 =    BEQ      STILL
                ; GO CLOSE GO AND THEN AS RELAYS
0141 7E 0121    JMP      GOOFF
                ; HERE IF WE WANT TO STAY OPEN
0144 86 FF      STILL:   LDAA     #$FF     ;WAKE ME UP AT
0146 97 04Z     STAA     GXCNTR   ;NEXT CLOCK TICK
0148 97 2FZ     STAA     GXCNTR+1
                ;
014A 39         GXD:     RTS
                ;
```

```
                ;
                ; NOTIME TURNS OFF A WHOLE SLEW OF COUNTERS
                ; CALL HERE WHEN YOU START A 'GO SEQUENCE'
                ; SO THAT YOUR PREDECESSORS CANNOT INTERFERE WITH YOU
                ;
0145 CE 0000 NOTIME: LDX        #0
0148 DF 02A      STX     ASCNTR
0150 DF 02Z      STX     GOCNTR
0152 DF 02Z      STX     OPCNTR
0154 39          RTS
                ;
                ;  RLYOFF
                ;
                ;
                ; RLYOFF CLOSES THE RELAY INDICATED
                ; BY MASK (E.G. $80) IN AC A
                ;
                ;
        0155P RLYOFF     =       *
0155 43          COMA
0156 94 A6       ANDA    BUFB
0158 97 A6       STAA    BUFB
                ;
015A 39          RTS
                ;
                ;
                ;  RLYON    ;TURNS ON A RELAY
                ;           ;BIT MASK E.G. $80 IN AC A
                ;
        015PP RLYON      =       *
015B 9A A6       ORAA    BUFB
015D 97 A6       STAA    BUFB
```

```
                ;
                ;
                ;  CAICT
                ;

                ;
                ;
                ;  CALCULATE TIMER CONSTANT FROM VALUE
                ;  IN ACCUM A. ACCUM A CONTAINS TIME IN SECONDS,
                ;  X POINTS TO TIMER.
                ;
                ;
0162 6F 00      CAICT:     CLR     0,X      ;ACCUMULATE TIMER CONST.
0164 6F 01         CLR     1,X      ;IN XREG2
                ;
                ;
0166 E6 01      CAICTL: LDAB       1,X      ;SUBTRACT ONE SECOND
0168 C0 20         SUBB    #LSB (-T.01S) ;EACH TIME THRU LOOP
016A E7 01         STAB    1,X
016C E6 00         LDAB    0,X
016E C2 01         SBCB    #MSB (-T.01S)    ;MSB
0170 E7 00         STAB    0,X
                ;
0172 4A            DECA                     ;GO THRU LOOP UNTIL
0173 26 F1 =       BNE     CAICTL           ;ACCUM A COUNTED OUT
                ;
                ;
0175 39            RTS                      ;RETURN WITH TIMER
                ;                           ;CONST. IN X
```

```
                ;
                ;  KEYSER
                ;
                ;

                ;  MAIN KEYBOARD SERVICE ENTRY,
                ;  CALL HERE AT RTC TO CHECK KEYBOARD
                ;  CONTINUALLY SHOVES NEW KEYS INTO KEYTAP
                ;  CALLS DEBOUNCE AND STASH ETC..
                ;
                ;
        0174P KEYSER     =        *
0174 BD 0173    JSR      DB       ;WHAT HAS BEEN PUSHED?
0177 4D         TSTA              ;FF MEANS NOTHING
0178 2B 03 =    BMI      NOKEY
017A BD 0199    JSR      STASH    ;PUT INTO MEMORY
                ;
017D 39         NOKEY:   RTS
                ;
```

```
                ;
                ;  DEBOUNCE
                ;
                ; RETURNS # OF KEY IN AC A
                ; RETURNS FF IF NO NEW KEYS THIS TIME
                ;
                ; USES SUBR KEYSCAN
                ;
        017EF DB =        *
017E BD 01D4     JSR      KEYSCN   ;GET NEW KEY IN B
0181 96 2C2      LDAA     OLDKEY
0183 D7 2C2      STAB     OLDKEY           ;SAVE THIS # FOR NEXT TIME
                ;                    ;A CONTAINS ONLY COPY OF OLD ONE
0185 11          CBA
0186 27 09 =     BEQ      OLDIE
                ; HERE IF WE SEE KEY FOR FIRST TIME
0188 7F 001F     CLR      KEYFLG
018B 86 FF       LDAA     #$FF             ;DON'T ASSIMILATE UNTIL LATER
018D 39          RTS

                ; HERE IF SEEN AT LEAST ONCE BEFORE
018E 7C 1FZ  OLDIE:      LDAB     KEYFLG
0190 27 03 =     BEQ      GOODIE
                ; HERE IF SEEN MANY TIMES
0192 86 FF       LDAA     #$FF
0194 39          RTS
                ;
0195 7A 001F GOODIE: DEC        KEYFLG           ;NO LONGER VIRGIN
0198 39          RTS                      ;KEY # IN AC A STILL
                ;
```

```
                ;
                ;  STASH   ;PROCESS KEYBOARD CHARS
                ;
                ; IF A NUM, STORES IT INTO KEYTAB
                ; AND INCREMENTS KEYCNT
                ; IF DURESS, SETS DURESS FLAG
                ;
                ; CALLED WITH CHAR IN AC A
                ;
        0199P STASH      =       *
                ; FIRST FOR THE SPECIAL CHECKS
                ;
0199 81 0A        CMPA    #$2A            ;DURESS CHARACTER
019B 27 2A =      BEQ     DURKEY
019D 2A 2F =      BPL     CMDKEY  ;10 AND UP ARE CMDS
                ; HERE IF IT IS A PLAIN NUMBER

019F 7D 021E      TST     POISON
01A2 27 03 =      BEQ     *+5
01A4 BD 01B5      JSR     BLANK   ;FIRST CHAR AFTER CMD CLEARS DISPLAY
                ; SEE IF THERE IS ROOM
01A7 D6 1BZ       LDAB    KEYCNT
01A9 C1 06        CMPB    #$06
01AB 27 07 =      BEQ     RTS4    ;DISPLAY ALREADY FULL
                ; OK, STICK IT IN
01AD 5C           INCB
01AE D7 1BZ       STAB    KEYCNT
01B0 DE 1AZ       LDX     KEYPTR  ;WHICH IS KEYCNT-1
01B2 A7 1CZ       STAA    KEYTAB-1,X
01B4 39         RTS4:     RTS
```

```
                ;

                ; HERE TO BLANK OUT THE WHOLE DISPLAY
                ; KRUMPS X AND B
        01B5F BLANK      =        *
01B5 D6 A6        LDAB     BUFP
01B7 CA 0E        ORAB     #$0E
01B9 D7 A6        STAB     BUFP
                ;
01BB CE 0F0F      LDX      #$0F0F
01BE DF 142       STX      KEYTAB
01C2 DF 162       STX      KEYTAB+2
01C2 DF 182       STX      KEYTAB+4
01C4 7F 001B      CLR      KEYCNT
01C7 7F 001E      CLR      POISON
01CA 39           RTS
                ;
        01CBF DURKEY     =        *
01CE 97 102       STAA     DURESF          ;MAKE FLAG NON-ZERO
01CD 39           RTS
                ;
                ; HERE WHEN WE SEE A CMD KEY
01CE 97 1D2   CMDKEY: STAA        CMDBYT
01D0 7C 001E      INC      POISON
01D3 39           RTS
                ;
```

```
                ;
                ;  KEYSCAN
                ;
                ; TELLS WHAT KEY IS DOWN
                ; ANSWER IS IN AC B
                ; 0 THROUGH $0A DESIGNATES KEY
                ; $10 THROUGH $1A DESIGNATES SHIFTED CONTROL KEY
                ; FF MEANS NO KEYS PUSHED
                ;
        01D4F KEYSCN     =        *

01D4 5F         CLRB             ;START WITH KEY 0
                ;
                ; DETERMINE WHAT ROW THE KEY IS IN
                ;
01D5 96 B0      LDAA     ROW0
01D7 43         COMA
01D8 84 F0      ANDA     #$F0     ;UNUSED BITS
01DA 26 15 =    BNE      GOTIT
01DC CB 04      ADDB     #4               ;NEXT ROW STARTS WITH KEY 4
                ;
01DE 96 B1      LDAA     ROW0+1
01E0 43         COMA
01E1 84 F0      ANDA     #$F0
01E3 26 0C =    BNE      GOTIT
01E5 CB 04      ADDB     #4
                ;
01E7 96 B2      LDAA     ROW0+2
01E9 43         COMA
                ;  ANDA     #$F0
01EA 84 70      ANDA     #$70             ;TRASH BIT FROM SHIFT KEY
01EC 26 03 =    BNE      GOTIT
```

```
                ; HERE IF NOW ROWS HAVE KEYS DOWN
01EB C6 FF          LDAB    #$FF
01F0 39             RTS
                ;

                ; NOW TO DETERMINE WHICH OF THE FOUR COLUMNS IT IS
                ; AT THIS POINT, B CONTAINS 0, 4, OR 8
                ; AND A CONTAINS A 'ONE-OF-FOUR' CODE IN THE MSB'S
                ; THE CODE FOR KEY 0 IS 10; KEY 1 IS 20, ETC.
                ;
        01F1F GOTIT       =       *

01F1 44             LSRA
01F2 44             LSRA
01F3 44             LSRA
01F4 44             LSRA
                ; NOW CODE IS THE THE FOUR LSB'S
01F5 44         KEYSI:      LSRA                    ;PUT A BIT INTO CARRY
                               FLAG

01F6 25 03 =        BCS     DONKEY  ;IF A ONE, THEN WE'RE THROUGH
01F8 50             INCB            ;NOPE...GO TO NEXT BIT
01F9 20 FA =        BRA     KEYSI   ;LOOP UNTIL FIND ONE
                ; NOTE THAT WE ARE GUARANTEED THAT AC IS NON-ZERO!!!
                ; HERE WITH NUMERIC IN AC B
                ; SEE IF SHIFT KEY IS PUSHED
01FB 7D 0002        TST     ROW0+2
01FE 2B 02 =        BMI     *+4             ;SKIP IF NOT PUSHED
0200 CA 10          ORAB    #$10    ;ADD IN SHIFT BIT
0202 39             RTS
                ;
```

What is claimed is:

1. A security access system, comprising:

a central processor, comprising:

a programmable memory storing data specifying personnel access at plural remote terminals; and means for communicating with said plural remote terminals; and plural remote terminals connected by said communicating means with said central processor, each comprising:

a programmable memory within said terminal storing data specifying personnel access for said remote terminal; and means within said terminal for providing selective, programmable access at n remote location in response to either said central processor memory data or said remote terminal memory data.

2. A security access system, as defined in claim 1, wherein said remote terminal additionally comprises:

means for programming said memory for storing different personnel access data in an ordered stack comprising:

means for deleting individual access data from said stack;

means for compressing said stack whenever said stack comprises memory locations from which access data has been deleted; and means for maintaining the order of said stack.

3. A security access system, as defined in claim 1, wherein said remote terminal additionally comprises:

means for storing data specifying times of day for access for said same personnel; and means for comparing said stored time of day data with real time to provide selective access.

4. A security access system, as defined in claim 3, wherein said means storing time of day access data is programmable.

5. A security access system, as defined in claim 4, wherein said comparing means comprises plural realtime clocks, each of which is independently setable to provide access at different times of day.

6. A security access system, as defined in claim 1, wherein said remote terminal means for providing access at a remote location in response to either said central processor memory data or said remote terminal memory data comprises means for determining the integrity of communication lines with said central processor and for providing access in response to said remote terminal memory data if said communication lines are faulty.

7. A security access system, as defined in claim 1, wherein said remote terminal additionally comprises:

keyboard means;

means connecting said keyboard means to program said memory; and means connected to said keyboard means and said memory for providing selective access at said remote location in response to data entered on said keyboard means by personnel requesting access.

8. A security access system, as defined in claim 7, wherein said data entered on said keyboard means for providing access is a predetermined permutation and combination of data stored in said memory.

*9. A security access system, as defined in claim 1, wherein at least one of said remote terminals is a unit comprising said programmable memory and said means for providing selective, programmable access.*

*10. A security access system, as defined in claim 1, wherein at least one of said remote terminals also includes a card reader.*

*11. A security access system, as defined in claim 1, wherein at least one of said remote terminals additionally comprises means responsive to magnetically coded indicia on a card for reading and storing an identification number peculiar to the holder of said card.*

*12. A security access system, as defined in claim 10 or 11, wherein at least one of said remote terminals is a unit.*

*13. A security access system, as defined in claim 1, wherein at least one of said remote terminals additionally comprises a door access control.*

*14. A security access system as defined in claim 1, wherein at least one of said remote terminals additionally comprises a keyboard.*

* * * * *